United States Patent
Gotoh

(10) Patent No.: US 11,240,484 B2
(45) Date of Patent: Feb. 1, 2022

(54) INFORMATION PROCESSING APPARATUS AND INFORMATION PROCESSING METHOD FOR STEREO IMAGING BASED ON CORRECTED PARAMETERS

(71) Applicant: SONY CORPORATION, Tokyo (JP)

(72) Inventor: Kenji Gotoh, Chiba (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/755,975

(22) PCT Filed: Jul. 24, 2018

(86) PCT No.: PCT/JP2018/027766
§ 371 (c)(1),
(2) Date: Apr. 14, 2020

(87) PCT Pub. No.: WO2019/082460
PCT Pub. Date: May 2, 2019

(65) Prior Publication Data
US 2020/0314410 A1 Oct. 1, 2020

(30) Foreign Application Priority Data
Oct. 23, 2017 (JP) .............................. JP2017-204265

(51) Int. Cl.
*H04N 13/246* (2018.01)
*H04N 13/271* (2018.01)
(Continued)

(52) U.S. Cl.
CPC ......... *H04N 13/246* (2018.05); *H04N 13/271* (2018.05); *H04N 13/282* (2018.05); *H04N 2013/0081* (2013.01)

(58) Field of Classification Search
CPC .. H04N 13/246; H04N 13/271; H04N 13/282; G01B 11/26
See application file for complete search history.

(56) References Cited

U.S. PATENT DOCUMENTS

2004/0252864 A1* 12/2004 Chang ................ G06K 9/00805
382/104
2009/0222229 A1 9/2009 Kakinami
(Continued)

FOREIGN PATENT DOCUMENTS

| CN | 102982557 A | 3/2013 |
| CN | 106233330 A | 12/2016 |

(Continued)

OTHER PUBLICATIONS

Extended European Search Report of EP Application No. 18870062.9, dated Nov. 9, 2020, 07 pages.
(Continued)

*Primary Examiner* — Zhubing Ren
(74) *Attorney, Agent, or Firm* — Chip Law Group

(57) ABSTRACT

The present disclosure relates to an information processing apparatus, an information processing method, and a program capable of obtaining the accuracy of the parameter regarding the attitude of a plurality of viewpoints with higher accuracy. Provided is an information processing apparatus including: a plane estimator configured to estimate a plane on the basis of a first depth map, the first depth map being obtained on the basis of a plurality of captured images acquired by image-capturing at a plurality of viewpoints; and a correction unit configured to correct a parameter regarding an attitude of the plurality of viewpoints on the basis of comparison between the first depth map and the plane.

14 Claims, 20 Drawing Sheets

(51) Int. Cl.
*H04N 13/282* (2018.01)
*H04N 13/00* (2018.01)

(56) References Cited

U.S. PATENT DOCUMENTS

| | | | | |
|---|---|---|---|---|
| 2013/0162631 A1* | 6/2013 | Chang | ................... | G06T 7/536 |
| | | | | 345/419 |
| 2013/0188861 A1 | 7/2013 | Rhee et al. | | |
| 2013/0250065 A1* | 9/2013 | Aoki | ................... | H04N 13/128 |
| | | | | 348/46 |
| 2015/0254814 A1* | 9/2015 | Ali | ..................... | G06T 5/003 |
| | | | | 382/255 |
| 2016/0335755 A1 | 11/2016 | Hilsebecher et al. | | |
| 2017/0277197 A1 | 9/2017 | Liao et al. | | |
| 2017/0322048 A1* | 11/2017 | Yoshida | ............. | H04N 13/254 |
| 2018/0322648 A1* | 11/2018 | Lu | ..................... | G06K 9/6269 |

FOREIGN PATENT DOCUMENTS

| | | |
|---|---|---|
| CN | 106296812 A | 1/2017 |
| CN | 107407558 A | 11/2017 |
| DE | 102014201271 A1 | 7/2015 |
| EP | 2096460 A2 | 9/2009 |
| EP | 2642448 A1 | 9/2013 |
| EP | 2887313 A1 | 6/2015 |
| EP | 3097537 A1 | 11/2016 |
| EP | 3258213 A1 | 12/2017 |
| JP | 2002-027507 A | 1/2002 |
| JP | 3792832 B2 | 7/2006 |
| JP | 2009-204532 A | 9/2009 |
| JP | 2013-224920 A | 10/2013 |
| JP | 2014-010100 A | 1/2014 |
| JP | 2014-138332 A | 7/2014 |
| JP | 2015-135317 A | 7/2015 |
| JP | 6317456 B2 | 4/2018 |
| WO | 2015/110207 A1 | 7/2015 |
| WO | 2016/129355 A1 | 8/2016 |
| WO | 2017/163596 A1 | 9/2017 |

OTHER PUBLICATIONS

International Search Report and Written Opinion of PCT Application No. PCT/JP2018/027766, dated Sep. 11, 2018, 11 pages of ISRWO.

Office Action for CN Patent Application No. 201880063856.X, dated May 18, 2021, 13 pages of English Translation and 06 pages of Office Action.

* cited by examiner

INFORMATION PROCESSING APPARATUS AND INFORMATION PROCESSING METHOD FOR STEREO IMAGING BASED ON CORRECTED PARAMETERS

CROSS REFERENCE TO RELATED APPLICATIONS

This application is a U.S. National Phase of International Patent Application No. PCT/JP2018/027766 filed on Jul. 24, 2018, which claims priority benefit of Japanese Patent Application No. JP 2017-204265 filed in the Japan Patent Office on Oct. 23, 2017. Each of the above-referenced applications is hereby incorporated herein by reference in its entirety.

TECHNICAL FIELD

The present disclosure relates to an information processing apparatus, an information processing method, and a program.

BACKGROUND ART

An approach to acquire distance information from a plurality of captured images acquired by image-capturing at a plurality of different viewpoints is known. Such an approach uses a parameter regarding characteristics of an image-capturing device that performs image-capturing at each viewpoint or a parameter regarding the position and attitude of viewpoints. Estimating such a parameter is called camera calibration or simply calibration, and for example, is previously performed before the acquisition of distance information (e.g., refer to Patent Document 1 below).

CITATION LIST

Patent Document

Patent Document 1: Japanese Patent Application Laid-Open No. 2002-27507

SUMMARY OF THE INVENTION

Problems to be Solved by the Invention

In the approach as described above, the accuracy of the parameter affects the accuracy of the distance information that is finally obtained, so it is desirable to obtain the accuracy of the parameter, particularly the accuracy of the parameter regarding the attitude of the viewpoint at which the image-capturing is performed with higher accuracy.

Solutions to Problems

According to the present disclosure, an information processing apparatus including a plane estimator configured to estimate a plane on the basis of a first depth map, the first depth map being obtained on the basis of a plurality of captured images acquired by image-capturing at a plurality of viewpoints, and a correction unit configured to correct a parameter regarding an attitude of the plurality of viewpoints on the basis of comparison between the first depth map and the plane.

Further, according to the present disclosure, there is provided an information processing method executed by a processor, including estimating a plane on the basis of a first depth map, the first depth map being obtained on the basis of a plurality of captured images acquired by image-capturing at a plurality of viewpoints, and correcting a parameter regarding an attitude of the plurality of viewpoints on the basis of comparison between the first depth map and the plane.

Further, according to the present disclosure, there is provided a program for causing a computer to execute a function of estimating a plane on the basis of a first depth map, the first depth map being obtained on the basis of a plurality of captured images acquired by image-capturing at a plurality of viewpoints, and a function of correcting a parameter regarding an attitude of the plurality of viewpoints on the basis of comparison between the first depth map and the plane.

Effects of the Invention

According to the present disclosure as described above, it is possible to obtain the accuracy of the parameter regarding the attitude of the viewpoint at which the image-capturing is performed with higher accuracy.

Note that the effects described above are not necessarily limitative. With or in the place of the above effects, there may be achieved any one of the effects described in this specification or other effects that may be grasped from this specification.

MODE FOR CARRYING OUT THE INVENTION

Figure 1:
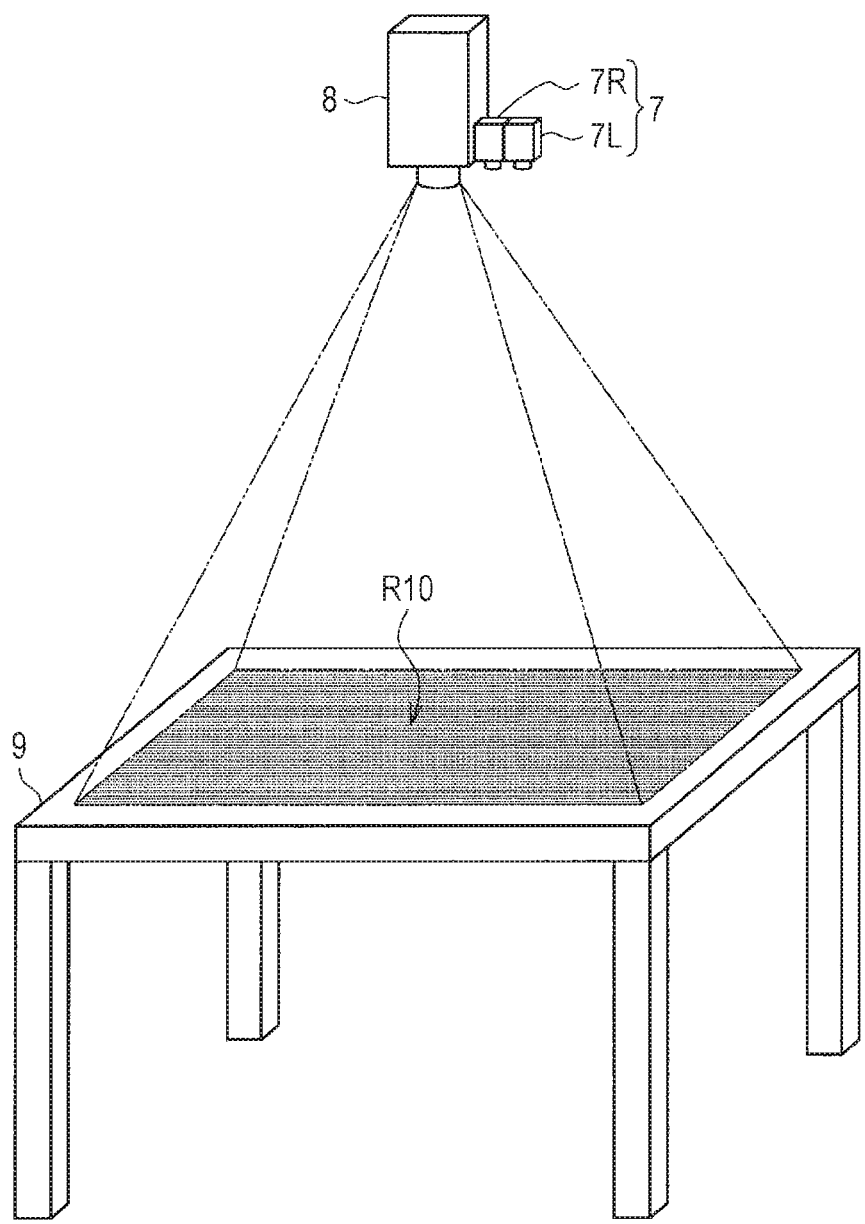
FIG. 1 is a diagram illustrated to describe a configuration example of an information processing system according to a first embodiment of the present disclosure.

Hereinafter, a preferred embodiment of the present disclosure will be described in detail with reference to the appended drawings. Note that, in this specification and the appended drawings, components that have substantially the same function and configuration are denoted with the same reference numerals, and repeated explanation of these structural elements is omitted.

Note that the description is given in the following order.
<<1. Background>>
<<2. Embodiments>>
<2-1. First embodiment>
<2-1. Second embodiment>
<2-2. Second embodiment>
<<3. Modifications>>
<3-1. First modification>
<3-2. Second modification>
<3-3. Third modification>
<<4. Hardware configuration example>>
<<5. Concluding remarks>>

1. Background

A depth map indicating distance information has been generated from a plurality of captured images acquired by the image-capturing at a plurality of different viewpoints (hereinafter also referred to as "image-capturing related viewpoint") recently. The use of the depth map makes it possible to recognize the real space with higher accuracy. For example, the depth map is used to recognize a gesture operation of a user.

Note that a case where a plurality of image-capturing images is acquired substantially simultaneously by a plurality of image-capturing devices is now mainly described as an example, but the present technology is not limited to such an example. The plurality of captured images can be acquired by, for example, the corresponding respective different image-capturing devices, or can be acquired over time by a single moving image-capturing device. In addition, an example in which two captured images are acquired typically by two image-capturing devices and a depth map is generated from the two captured images is now mainly described, but the present technology is not limited to such an example, and a depth map can be generated from three or more captured images.

One of the approaches to generate the depth map is stereo matching that searches for and matches corresponding points between a plurality of captured images. In stereo matching, to efficiently search for a corresponding point, the search direction of the corresponding point can be limited to one direction in some cases. For example, in a case where the arrangement direction of the image-capturing related viewpoint is limited to one direction, an efficient search for the corresponding points is achieved by limiting the search direction of the corresponding point to the arrangement direction. In an apparatus or system using stereo matching, a plurality of image-capturing devices is often arranged in the horizontal direction to perform a search for the corresponding point in the horizontal direction. In a case where the search direction of the corresponding point is limited to the horizontal direction, it is desirable that there is no vertical misalignment between captured images.

However, it is difficult to arrange the image-capturing device with high accuracy, and also the misalignment in the arrangement occurs over time in some cases. In addition, in a case where positional misalignment in the vertical direction or the depth direction or attitude misalignment between the image-capturing related viewpoints occurs, vertical misalignment can occur between the captured images. In addition, in a case where a plurality of captured images is acquired by the corresponding respective different image-capturing devices, differences in the characteristics between the image-capturing devices can also affect vertical misalignment between the captured images.

For this reason, the image processing for reducing the vertical misalignment between the captured images is performed before the stereo matching is performed. Such image processing is capable of being achieved by parallelization processing or projective transformation, which is called image rectification, using, in on example, a parameter regarding the characteristics of the image-capturing device (what is called, internal parameter) or a parameter regarding the viewpoint position and attitude (what is called, external parameter). Moreover, the parameter regarding the viewpoint position and attitude used upon performing the parallelization processing can be given as the position and attitude for each viewpoint or can be given as the position difference and attitude difference between viewpoints.

Estimating such a parameter is called camera calibration or simply calibration, and for example, is previously performed before the stereo matching. To generate a depth map with high accuracy by the stereo matching, it is important to perform such parallelization processing with high accuracy, and it is desirable to acquire a highly accurate parameter. Thus, immediately after calibration, it is desirable to perform correction for further increasing the accuracy of the parameter or correction for reflecting misalignment that occurs due to the elapse of a certain amount of time after performing the calibration.

The correction of a parameter regarding the attitude of a viewpoint is now considered. The attitude of a viewpoint can be defined in terms of a pitch angle that is an angle of rotation around the side-to-side axis, a yaw angle that is an angle of rotation around the vertical axis, and a roll angle that is an angle of rotation around the front-to-back axis. Among them, a difference in roll angle between viewpoints (hereinafter also referred to as a roll angle between viewpoints, or simply a roll angle) has a great influence on whether or not matching is valid in stereo matching. For this reason, the larger the error included in the estimated roll angle between viewpoints, the larger the matching error in stereo matching between captured images that are subjected to parallelization processing using a parameter including the roll angle.

It is conceivable to improve the accuracy of the roll angle between viewpoints using such a tendency. For example, the stereo matching between captured images that are subjected to the parallelization processing while changing the roll angle between viewpoints and the search for a roll angle that minimizes the matching error make it possible to correct the roll angle between the viewpoints with higher accuracy.

However, it is difficult to correct, with higher accuracy, the difference in pitch angle between viewpoints (hereinafter also referred to as a pitch angle between viewpoints, or simply a pitch angle) and the difference in yaw angle between viewpoints (hereinafter referred to as a yaw angle between viewpoints, or simply a yaw angle). For example, even if the correction is performed in a similar manner to the above-described method of correcting the roll angle, the effect of the pitch angle or yaw angle error on whether or not the matching is valid in stereo matching is small, so the correction is unable to be performed with higher accuracy. However, in a case where the pitch angle between viewpoints or the yaw angle between viewpoints contains an error, matching itself is possible to be performed, but errors such as distortion could occur in the depth map generated by stereo matching.

Thus, one who conceived the present disclosure defines embodiments of the present disclosure in consideration of the above-mentioned circumstances. The embodiments of the present disclosure allow the pitch angle between viewpoints and the yaw angle between viewpoints to be corrected with higher accuracy, in consideration of the distortion of the depth map generated by stereo matching and on the basis of the comparison between the depth map and a plane estimated from the depth map. A first embodiment and a second embodiment of the present disclosure that achieve the above-described effects are now described in detail.

2. Embodiments

2-1. First Embodiment (System Configuration Example)

FIG. 1 is a diagram illustrated to describe a configuration example of an information processing system according to a first embodiment of the present disclosure. As illustrated in FIG. 1, the information processing system according to the present embodiment includes a stereo camera 7 and a projector 8.

The stereo camera 7 includes a right camera 7R and a left camera 7L. The right camera 7R and the left camera 7L each includes a lens system including an image-capturing lens, a diaphragm, a focus lens, or the like, a drive system that allows a focusing operation to be performed on the lens system, and a solid-state image sensor array that photoelectrically converts image-capturing light obtained by the lens system to generate an image-capturing signal, and the like. Moreover, the lens system can include a zoom lens, and in such a case, the drive system can cause the lens system to perform a zoom operation. The solid-state image sensor array can be configured as, for example, a charge-coupled device (CCD) sensor array or a complementary-metal-oxide semiconductor (CMOS) sensor array.

The right camera 7R and the left camera 7L each acquires a captured image, and hereinafter in some cases, the captured image acquired by the right camera 7R is referred to as an R image and the captured image acquired by the left camera 7L is referred to as an L image in some cases. Specifically, the position and attitude of the right camera 7R are the position and attitude of the image-capturing related viewpoint of the R image, and the position and attitude of the left camera 7L are the position and attitude of the image-capturing related viewpoint of the L image.

Further, the right camera 7R and the left camera 7L are arranged side-by-side horizontally. For this reason, there is mainly horizontal misalignment in the image-capturing ranges of the right camera 7R and the left camera 7L. At least a part of the image-capturing ranges of the right camera 7R and the left camera 7L overlaps and further, it is desirable that a relatively large part thereof overlaps. The stereo camera 7 is arranged to face the top surface of a table 9 that is a plane as illustrated in FIG. 1. In the present embodiment, an overlapping portion of the image-capturing ranges of the right camera 7R and the left camera 7L is not illustrated in FIG. 1, but it can be included in the top surface of the table 9 and can be substantially the same as a projection region R10 of the projector 8 described later.

Moreover, a parameter regarding the characteristics and the position or attitude of the right camera 7R and the left camera 7L is calculated by calibration performed in advance or is acquired in designing the stereo camera 7. Note that, an error is occasionally included in the pitch angle and the yaw angle between the right camera 7R and the left camera 7L among the parameters.

The projector 8 projects an image onto the top surface of the table 9. In the example illustrated in FIG. 1, the projector 8 projects an image onto the projection region R10 on the top surface of the table 9. Although the image projected by the projector 8 can be various types of images, the projector 8 desirably projects, for example, an image suitable for the stereo matching. An image suitable for the stereo matching is, for example, an image sufficiently including characteristic points or textures.

Moreover, although FIG. 1 illustrates an example in which the stereo camera 7 and the projector 8 are arranged right above the table 9, the configuration according to the present embodiment is not limited to such an example. The stereo camera 7 and the projector 8 can be arranged obliquely above the table 9.

Further, the information processing system according to the present embodiment includes an information processing apparatus that is not illustrated in FIG. 1. Although the arrangement of such an information processing apparatus is not limited, such an information processing apparatus is connected to the stereo camera 7 and the projector 8 illustrated in FIG. 1. A configuration example of the information processing apparatus included in the information processing system according to the present embodiment (hereinafter also referred to as the information processing apparatus according to the present embodiment) is now described.

(Configuration Example of Information Processing Apparatus)

Figure 2:
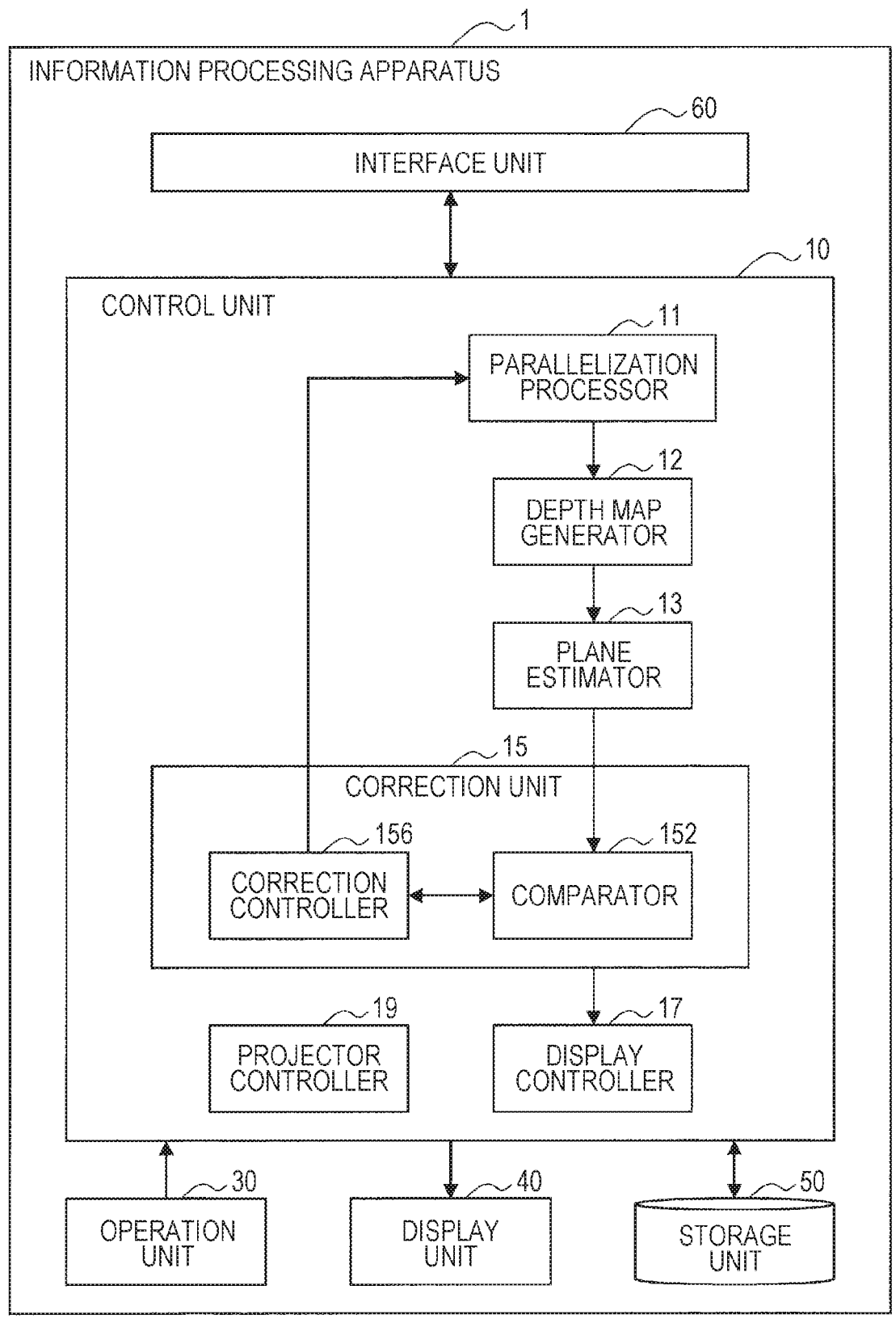
FIG. 2 is a block diagram illustrating a configuration example of an information processing apparatus 1 according to the present embodiment.

FIG. 2 is a block diagram illustrating a configuration example of an information processing apparatus 1 according to the present embodiment. As illustrated in FIG. 2, the information processing apparatus 1 according to the present embodiment includes a control unit 10, an operation unit 30, a display unit 40, a storage unit 50, and an interface unit 60.

The control unit 10 controls each component of the information processing apparatus 1. In addition, the control unit 10 also functions as a parallelization processor 11, a depth map generator 12, a plane estimator 13, a correction unit 15, a display controller 17, and a projector controller 19, as illustrated in FIG. 2.

The parallelization processor 11 performs parallelization processing for reducing vertical misalignment between the R image and the L image with respect to the R image and the L image acquired by the interface unit 60 described later from the stereo camera 7 illustrated in FIG. 1. For example, the parallelization processing performed by the parallelization processor 11 can include projective transformation processing using a parameter regarding the characteristics and the position or attitude of the right camera 7R and the left camera 7L. Moreover, the parameter used by the parallelization processor 11 can be a parameter stored in the storage unit 50 in advance or for example, a parameter calculated by calibration, a parameter set in designing the stereo camera 7, or the like. In addition, the parallelization processor 11 can perform the parallelization processing using a parameter provided from the correction unit 15 described later.

Moreover, hereinafter, an image obtained by the parallelization processor 11 performing the parallelization processing on the R image is referred to as a parallelized R image, and an image obtained by the parallelization processor 11 performing the parallelization processing on the L image is referred to as a parallelized L image. The parallelization processor 11 outputs the parallelized R image and the parallelized L image to the depth map generator 12.

The depth map generator 12 generates a depth map by applying the stereo matching using the parallelized R image and the parallelized L image, which are provided from the parallelization processor 11. Moreover, the search direction for a corresponding point in the stereo matching performed by the depth map generator 12 according to the present embodiment is the horizontal direction. The depth map generator 12 outputs the generated depth map to the plane estimator 13.

The plane estimator 13 estimates a plane on the basis of the depth map generated by the depth map generator 12. For example, the plane estimator 13 receives a group of three-dimensional points obtained from the depth map generated by the depth map generator 12 and estimates a plane included in the three-dimensional point group.

The plane estimator 13 removes noise by using the plane estimation technique such as the random sample consensus (RANSAC) method and can estimate one plane. In addition, in a case where the three-dimensional point group includes a plurality of planes or a case where it includes points other than a plane, points that belong to a plane other than the largest plane (plane that has the largest number of points) and points other than the plane can be removed as noise to estimate the plane. However, to perform the plane estimation with higher accuracy and to perform correction processing described later with higher accuracy, planes other than the largest plane, other objects, and the like are not desirably included, as much as possible, in the image-capturing range of the stereo camera 7, particularly the overlapping portion of the image-capturing ranges of the right camera 7R and the left camera 7L. For this reason, as described with reference to FIG. 1, the stereo camera 7 is desirably arranged so that the overlapping portion of the image-capturing ranges of the right camera 7R and the left camera 7L can be included in the top surface of the table 9 that is a plane. In addition, it is desirable that there is no unnecessary object placed on the top surface of the table 9.

The plane estimator 13 outputs information indicating the estimated plane (e.g., a plane equation) to the correction unit 15.

The correction unit 15 corrects a parameter regarding the attitude of the right camera 7R and the left camera 7L on the basis of the comparison between the depth map generated by the depth map generator 12 and the plane estimated by the plane estimator 13 (hereinafter in some cases referred to as an estimated plane). The parameter regarding the attitude of the right camera 7R and the left camera 7L corrected by the correction unit 15 can include the pitch angle between the right camera 7R and the left camera 7L and the yaw angle between the right camera 7R and the left camera 7L. The correction unit 15 corrects the pitch angle between the right camera 7R and the left camera 7L and acquires the corrected pitch angle. In addition, the correction unit 15 corrects the yaw angle between the right camera 7R and the left camera 7L and acquires the corrected yaw angle. As illustrated in FIG. 2, the correction unit 15 includes a comparator 152 and a correction controller 156.

The comparator 152 compares the depth map generated by the depth map generator 12 with the depth map generated on the basis of the estimated plane. Moreover, in some cases, the depth map generated by the depth map generator 12 is referred to as a first depth map and the depth map generated on the basis of the estimated plane is referred to as a second depth map, which are terms hereinafter used for the purpose of distinguishing.

The second depth map is a depth map in which the estimated plane is viewed from the same viewpoint as that of the first depth map, and can be generated, for example, by projecting the three-dimensional point group existing on the estimated plane onto the second depth map.

In the present embodiment, it is considered that the smaller the difference between the first depth map and the second depth map, the smaller the error included in the parameter regarding the attitude of the right camera 7R and the left camera 7L. Thus, the comparator 152 can perform the comparison, for example, by acquiring a difference (subtraction) between the first depth map and the second depth map. In addition, the comparator 152 can generate a difference map obtained by subtracting the second depth map from the first depth map for each pixel.

Further, the comparator 152 compares the first depth map and the second depth map to calculate an estimation value used to correct the pitch angle and an estimation value used to correct the yaw angle. Such a configuration makes it possible to calculate an estimation value that reflects distortion occurring in the first depth map due to an error in the pitch angle and the yaw angle. Moreover, in some cases, the estimation value used to correct the pitch angle is referred to as a first estimation value and the estimation value used to correct the yaw angle is referred to as a second estimation value, which are terms hereinafter used for the purpose of convenience of description.

The comparator 152 can calculate the first estimation value, for example, so that the first estimation value increases as a difference between the original pitch angle and the pitch angle included in the current parameter increases. In addition, the comparator 152 can calculate the second estimation value so that the second estimation value increases as a difference between the original yaw angle and the yaw angle included in the current parameter increases. A method by which such a comparator 152 calculates the estimation value is now described with reference to FIGS. 3 to 6.

For example, the comparator 152 compares the first depth map and the second depth map for each of the regions divided into four by a horizontal centerline and a vertical centerline and calculates the first estimation value used to correct the pitch angle between the right camera 7R and the left camera 7L. The comparator 152 can calculate the sum of differences between the first depth map and the second depth map for each of the regions to calculate the first estimation value on the basis of the sum of the differences.

Figure 3:
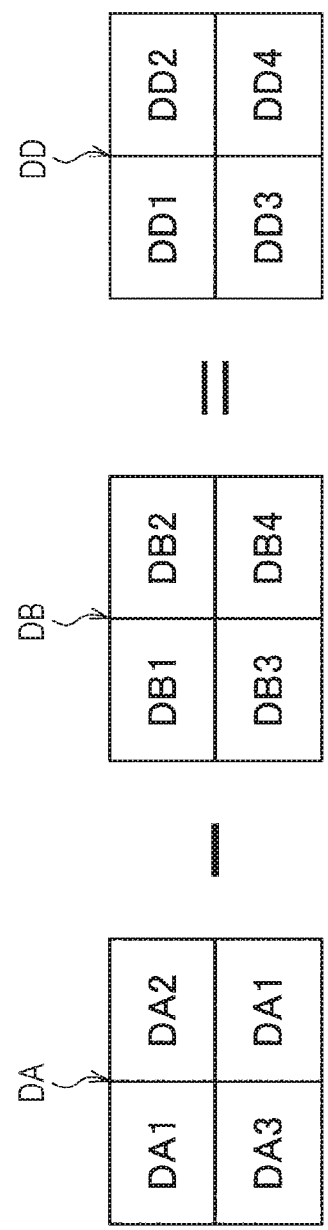
FIG. 3 is a diagram illustrated to describe a method of calculating a first estimation value.

FIG. 3 is a diagram illustrated to describe a method of calculating the first estimation value. FIG. 3 illustrates a first depth map DA, a second depth map DB, and a difference map DD obtained by subtracting the second depth map DB from the first depth map DA. The comparator 152 calculates the sum of the differences between the first depth map and the second depth map for each of the regions divided into four by the horizontal centerline and the vertical centerline as illustrated in FIG. 3. In other words, the sum is calculated for each of regions DD1 to DD4 of the difference map DD obtained by subtracting regions DB1 to DB4 of the second depth map DB from the corresponding respective regions DA1 to DA4 of the first depth map DA. Moreover, the sum of differences calculated for each region is hereinafter referred to as a difference sum in some cases.

For example, the comparator 152 calculates an absolute value of a difference between the difference sums for each of upper and lower regions and can calculate the first estimation value on the basis of the absolute value of a difference between the difference sums. In this description, assuming that the difference sums calculated for the regions DD1, DD2, DD3, and DD4 are $d_1$, $d_2$, $d_3$, and $d_4$, respectively, the comparator 152 can calculate a first estimation value $E_1$ as represented by Formula (1) below.

$$E_1 = |d_1 - d_3| + |d_2 - d_4| \qquad (1)$$

Figure 4:
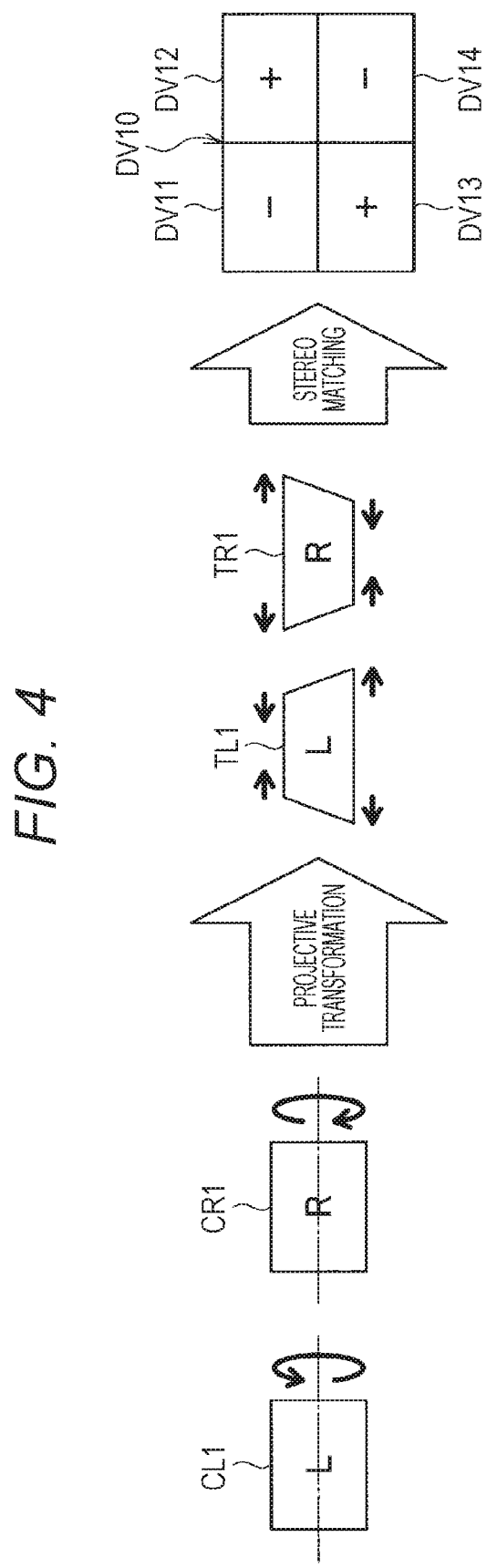
FIG. 4 is a schematic diagram schematically illustrating the variation in a depth map generated upon changing a pitch angle.

The reason why the first estimation value $E_1$ calculated as shown in Formula (1) is used to correct the pitch angle is described with reference to FIGS. 4 to 6. FIG. 4 is a schematic diagram schematically illustrating the variation in the depth map generated upon changing the pitch angle.

The correction controller 156 described later corrects the pitch angle so that the first estimation value can decrease while changing (varying) the pitch angle. In this context, in the case of changing the pitch angle, a trapezoidal variation occurs due to the projective transformation included in the parallelization processing performed by the parallelization processor 11.

When the projective transformation is applied to an L image CL1 and an R image CR1 by changing the pitch angle between the right camera 7R and the left camera 7L as illustrated in FIG. 4, a parallelized L image TL1 and a parallelized R image TR1 are obtained. In addition, a depth map variation DV10 illustrated in FIG. 4 indicates the amount of variation that occurs in each region of the depth map obtained by stereo matching with the right camera 7R as a reference in a case where the pitch angle is changed as illustrated in FIG. 4.

As illustrated in FIG. 4, in each of the parallelized L image TL1 and the parallelized R image TR1, the upper side and the lower side thereof are different in length before and after applying the projective transformation. Thus, in the example illustrated in FIG. 4, upon comparison between the L image CL1 and the parallelized L image TL1, the pixels existing on the upper side move to the center side in the horizontal direction, and the pixels existing on the lower side move outside in the horizontal direction. In addition, in the example illustrated in FIG. 4, upon comparison between the R image CR1 and the parallelized R image TR1, the pixels existing on the upper side move outward in the horizontal direction, and the pixels existing on the lower side move to the center side in the horizontal direction.

For this reason, in the depth map variation DV10, the amount of variation in the upper-left region DV11 and the lower-right region DV14 is negative, and the amount of variation in the upper-right region DV12 and the lower-left region DV13 is positive. Specifically, the sign (positive/negative) is different for each of the upper and lower regions, and the sign matches for each region located diagonally. Thus, in a case where there is misalignment in the pitch angle, if the value obtained by simply summing up the differences in the entire difference map as the estimation value, the regions with different signs cancel each other out, and so there is a possibility that the magnitude relationship between the pitch angle misalignment and the estimation value is not maintained. On the other hand, when the absolute value of a difference between the difference sums is calculated for each of the upper and lower regions as shown in Formula (1), and the first estimation value is calculated on the basis of the absolute value, it is possible to maintain the magnitude relationship between the pitch angle misalignment and the first estimation value.

Moreover, the example illustrated in FIG. 4 exemplifies the example in which the projective transformation is performed by distributing the amount of variation in the pitch angle to both the L image CL1 and the R image CR1, but the parallelization is also achievable by performing the projective transformation by distributing it to only one of the images. Even in such a case, the tendency of the amount of variation in the depth map due to the variation in the pitch angle is similar to the example.

Moreover, although it is desirable that there is no vertical misalignment to achieve the stereo matching, the vertical position of each pixel falls misaligned with the change of the pitch angle. For this reason, although FIG. 4 illustrates only the variation in the pitch angle, in practical each pixel desirably moves also in the vertical direction in the parallelization processing. For example, the projective transformation that moves it in the vertical direction is applicable so that there is no vertical misalignment (to prevent the vertical center point from moving) with the change of the pitch angle.

Here, referring to the depth map variation DV10 illustrated in FIG. 4, not only the upper and lower regions but also the left and right regions have different signs. However, in a case where there is misalignment not only in the pitch angle but also in the yaw angle, it is desirable to calculate the absolute value of a difference between the difference sums for each of the upper and lower regions to calculate the estimation value as shown in Formula (1), rather than to calculate the absolute value of a difference between the difference sums for each of the left and right regions to calculate the estimation value. In the present embodiment, the correction controller 156 described later corrects the pitch angle and then corrects the yaw angle, and so it is desirable to calculate the absolute value of the difference between the difference sums for each of the upper and lower regions to calculate the estimation value. The description of the reason thereof is now described with reference to FIGS. 5 and 6. FIGS. 5 and 6 are schematic diagrams schematically illustrating the variation in the depth map generated upon changing the yaw angle.

Figure 5:
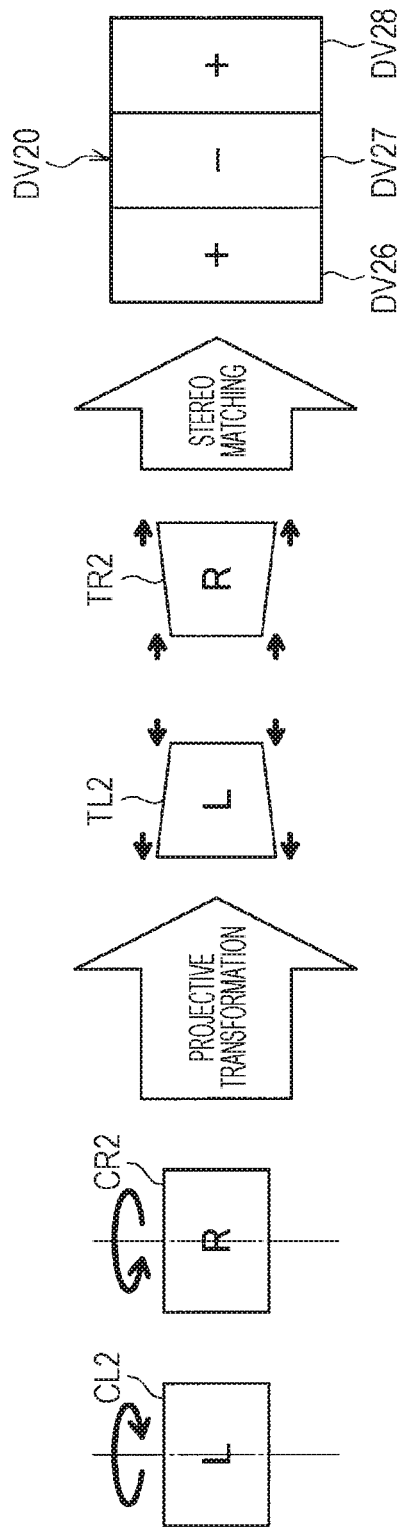
FIG. 5 is a schematic diagram schematically illustrating the variation in a depth map generated upon changing a yaw angle.

When the projective transformation is applied to an L image CL2 and an R image CR2 by changing the yaw angle between the right camera 7R and the left camera 7L as illustrated in FIG. 5, a parallelized L image TL2 and a parallelized R image TR2 are obtained. In addition, a depth map variation DV20 illustrated in FIG. 5 indicates the amount of variation that occurs in each region of the depth map obtained by stereo matching with the right camera 7R as a reference in a case where the yaw angle is changed as illustrated in FIG. 5.

As illustrated in FIG. 5, in each of the parallelized L image TL2 and the parallelized R image TR2, the right side and the left side thereof are different in length before and after applying the projective transformation. Thus, in the example illustrated in FIG. 5, upon comparison between the L image CL2 and the parallelized L image TL2, both the pixels existing on the right side and the pixels existing on the left side move in the left direction. Moreover, although not illustrated, upon the comparison between the L image CL2 and the parallelized L image TL2, the pixels existing in the vicinity of the center move in the right direction. In addition, in the example illustrated in FIG. 5, upon comparison between the R image CR2 and the parallelized R image TR2, both the pixels existing on the right side and the pixels existing on the left side move in the right direction. Moreover, although not illustrated upon the comparison between the R image CR2 and the parallelized R image TR2, the pixels existing in the vicinity of the center move in the left direction.

Thus, in the depth map variation DV20, the amount of variation in a left region DV26 is positive, the amount of variation in a central region DV27 is negative, and the amount of variation in a right region DV28 is positive.

Figure 6:
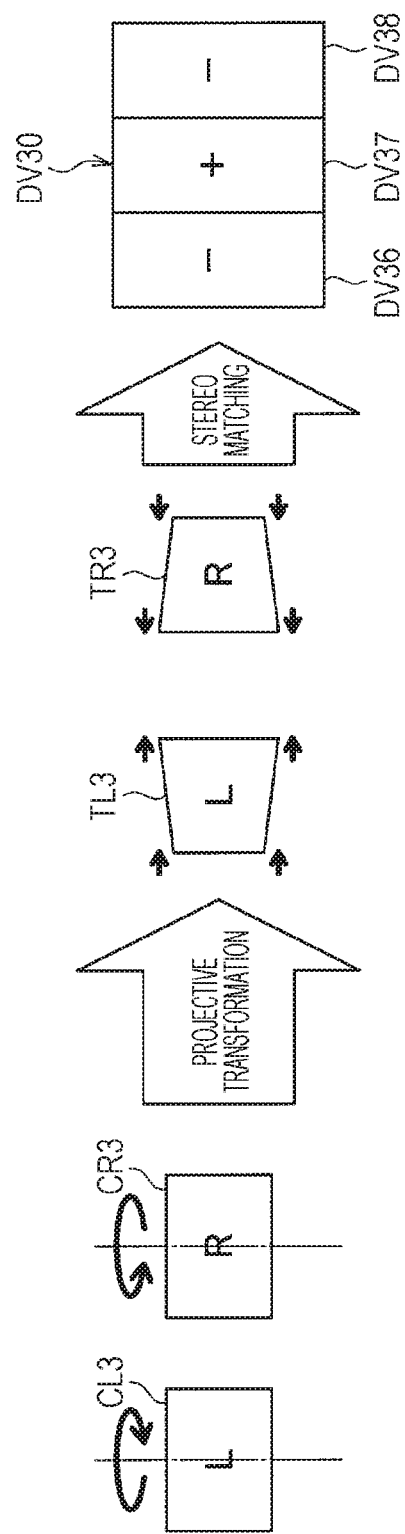
FIG. 6 is a schematic diagram schematically illustrating the variation in a depth map generated upon changing a yaw angle.

In addition, when the projective transformation is applied to an L image CL3 and an R image CR3 by changing the yaw angle between the right camera 7R and the left camera 7L as illustrated in FIG. 6, a parallelized L image TL3 and a parallelized R image TR3 are obtained. In addition, a depth map variation DV30 illustrated in FIG. 6 indicates the amount of variation that occurs in each region of the depth map obtained by stereo matching with the right camera 7R as a reference in a case where the yaw angle is changed as illustrated in FIG. 6.

As illustrated in FIG. 6, in each of the parallelized L image TL3 and the parallelized R image TR3, the right side and the left side thereof are different in length before and after applying the projective transformation. Thus, in the example illustrated in FIG. 6, upon comparison between the L image CL3 and the parallelized L image TL3, both the pixels existing on the right side and the pixels existing on the left side move in the right direction. Moreover, although not illustrated, upon the comparison between the L image CL3 and the parallelized L image TL3, the pixels existing in the vicinity of the center move in the left direction. In addition, in the example illustrated in FIG. 6, upon comparison between the R image CR3 and the parallelized R image TR3, both the pixels existing on the right side and the pixels existing on the left side move in the left direction. Moreover, although not illustrated, upon the comparison between the R image CR3 and the parallelized R image TR3, the pixels existing in the vicinity of the center move in the right direction.

Thus, in the depth map variation DV30, the amount of variation in a left region DV36 is negative, the amount of variation in a central region DV37 is positive, and the amount of variation in a right region DV38 is negative.

Considering the above-mentioned tendency of the variation in depth map in the case of changing the yaw angle, the tendency of variation is different in the horizontal direction and matches in the vertical direction. Thus, if the first estimation value is calculated by calculating the absolute value of a difference between the difference sums for each of the left and right regions before correcting the yaw angle, there is a possibility that the magnitude relationship between the pitch angle misalignment and the first estimation value is not be maintained. Thus, it is desirable to calculate the absolute value of the difference between the difference sums for each of the upper and lower regions as shown in Formula (1) above to calculate the first estimation value on the basis of the absolute value.

The method of calculating the first estimation value used to correct the pitch angle is described above. Subsequently, a method of calculating the second estimation value used to correct the yaw angle is now described.

The comparator 152 can calculate the second estimation value used to correct the yaw angle, for example, on the basis of the variance of the difference between the first depth map and the second depth map. Considering the above-mentioned tendency of the variation in the depth map in the case of changing the yaw angle, the larger the difference between the original yaw angle and the yaw angle included in the current parameter, the larger the variance of the difference between the first depth map and the second depth map. Thus, for example, the comparator 152 can calculate the variance of the difference between the first depth map and the second depth map as a whole without performing the division into regions and use the calculated variance as the second estimation value.

The method of calculating the first estimation value and the method of calculating the second estimation value performed by the comparator 152 are described above. Moreover, the methods of calculating the estimation value are not limited to the examples described above. Other methods of calculating the estimation value will be described later as modifications.

The description continues referring back to FIG. 2. The correction controller 156 performs control relating to the processing of correcting the parameter regarding the attitude of the right camera 7R and the left camera 7L. For example, the correction controller 156 corrects the pitch angle using the first estimation value calculated by the comparator 152. In addition, the correction controller 156 corrects the yaw angle using the second estimation value calculated by the comparator 152.

Moreover, as described above, the comparator 152 can calculate the first estimation value used to correct the pitch angle and the second estimation value used to correct the yaw angle by employing different methods. The correction controller 156 can perform the pitch angle correction and the yaw angle correction separately.

Further, the correction controller 156 can correct the pitch angle and then correct the yaw angle. As described above, the first estimation value used to correct the pitch angle is calculated such that the pitch angle can be corrected without being affected by the misalignment in the yaw angle, and so it is possible to perform the respective correction operations independently by correcting the yaw angle after correcting the pitch angle.

The correction controller 156 can specify a pitch angle at which the first estimation value calculated by the comparator 152 satisfies a predetermined condition (hereinafter also referred to as a condition regarding the first estimation value) as a corrected pitch angle. For example, in a case where the first estimation value is calculated so that the first estimation value increases as the difference between the original pitch angle and the pitch angle included in the current parameter increases as described above, the correction controller 156 desirably searches for (specifies) a pitch angle having a smaller first estimation value.

Thus, for example, the condition regarding the first estimation value can be, for example, the smallest of the first estimation values calculated on the basis of a plurality of pitch angles. In such a case, for example, the correction controller 156 can repeat the control of changing the pitch angle, for example, within a predetermined range and simultaneously providing a parameter including the changed pitch angle to the parallelization processor 11, and then causing the comparator 152 to calculate the first estimation value. Then, the correction controller 156 can specify a pitch angle at which the first estimation value is finally minimized as the corrected pitch angle.

Moreover, the condition regarding the first estimation value is not limited to the example described above, and for example, it can be smaller than a predetermined threshold. Further, in the above, the description is given of the case where the first estimation value is calculated so that the first estimation value increases as the difference between the original pitch angle and the pitch angle included in the current parameter increases. The condition regarding the first estimation value can be a condition corresponding to the method of calculating the first estimation value. For example, in a case where the first estimation value is calculated so that the first estimation value decreases as the difference between the original pitch angle and the pitch angle included in the current parameter increases, a condition obtained by inverting the magnitude of the above-described condition can be used as the condition regarding the first estimation value.

Likewise, in addition, the correction controller 156 can specify a yaw angle at which the second estimation value calculated by the comparator 152 satisfies a predetermined condition (hereinafter also referred to as a condition regarding the second estimation value) as a corrected yaw angle. For example, in a case where the second estimation value is calculated so that the second estimation value increases as the difference between the original yaw angle and the yaw angle included in the current parameter increases as described above, the correction controller 156 desirably searches for (specifies) a yaw angle having a smaller second estimation value.

Thus, for example, the condition regarding the second estimation value can be, for example, the smallest of the second estimation values calculated on the basis of a plurality of yaw angles. In such a case, for example, the correction controller 156 can repeat the control of changing the yaw angle, for example, within a predetermined range and simultaneously providing a parameter including the changed yaw angle to the parallelization processor 11, and then causing the comparator 152 to calculate the second estimation value. Then, the correction controller 156 can specify a yaw angle at which the second estimation value is finally minimized as the corrected yaw angle.

Note that, the condition regarding the second estimation value is not limited to the example described above, and for example, it can be smaller than a predetermined threshold. Further, in the above, the description is given of the case where the second estimation value is calculated so that the second estimation value increases as the difference between the original yaw angle and the yaw angle included in the current parameter increases. The condition regarding the second estimation value can be a condition corresponding to the method of calculating the second estimation value. For example, in a case where the second estimation value is calculated so that the second estimation value decreases as the difference between the original yaw angle and the yaw angle included in the current parameter increases, a condition obtained by inverting the magnitude of the above-described condition can be used as the condition regarding the second estimation value.

Further, the correction controller 156 can determine whether or not to correct the pitch angle and the yaw angle described above. For example, the correction controller 156 provides the difference map generated by the comparator 152 to the display controller 17 to be displayed on the display unit 40. Then, the correction controller 156 receives, via the operation unit 30, the input of the user checking the display and can perform the determination in response to such user input. Alternatively, the correction controller 156 can automatically perform such determination on the basis of the difference map generated by the comparator 152.

The display controller 17 controls the display unit 40. For example, the display controller 17 can cause the difference map provided from the correction unit 15 or the first depth map generated by the depth map generator 12 to be displayed. Moreover, a display example of the difference map will be described later with reference to FIG. 8.

The projector controller 19 controls the projector 8 connected via the interface unit 60 to project an image onto the top surface of the table 9. As described above, the image projected by the projector controller 19 is preferably an image suitable for the stereo matching but is not limited to a known image. The processing performed by the parallelization processor 11, the depth map generator 12, the plane estimator 13, and the correction unit 15 described above can be performed without using information regarding an image projected by the projector controller 19.

The operation unit 30 receives user input. The operation unit 30 according to the present embodiment can receive, for example, a user input regarding whether or not to correct the pitch angle and the yaw angle described above. In addition, the operation unit 30 can be configured as, for example, mouse, keyboards, touch panels, buttons, switches, levers, dials, or the like.

The display unit 40 is a display or the like that performs display under the control of the display controller 17. The display unit 40 displays, for example, the difference map as described above.

The storage unit 50 stores programs and parameters used for the control unit 10 to execute each function. For example, the storage unit 50 can store, for example, a parameter calculated by calibration performed in advance, a parameter set in designing the stereo camera 7, or the like.

The interface unit 60 mediates communication with other devices by wire or wireless. For example, the interface unit 60 is connected to the stereo camera 7 illustrated in FIG. 1 and receives the R image acquired by the right camera 7R and the L image acquired by the left camera 7L from the stereo camera 7. In addition, the interface unit 60 is connected to the projector 8 illustrated in FIG. 1 and transmits an image to be projected by the projector 8 to the projector 8.

The configuration examples of the information processing apparatus 1 according to the present embodiment are described above. However, the configuration of the information processing apparatus 1 is not limited to such examples, and for example, at least some of the functions of the control unit 10 of the information processing apparatus 1 can be provided by other devices. For example, in a case where the projector 8 illustrated in FIG. 1 is not connected to the information processing apparatus 1 and is connected to another device, the other device connected to the projector 8 can be provided with the function of the projector controller 19.

(Operation Example)

Figure 7:
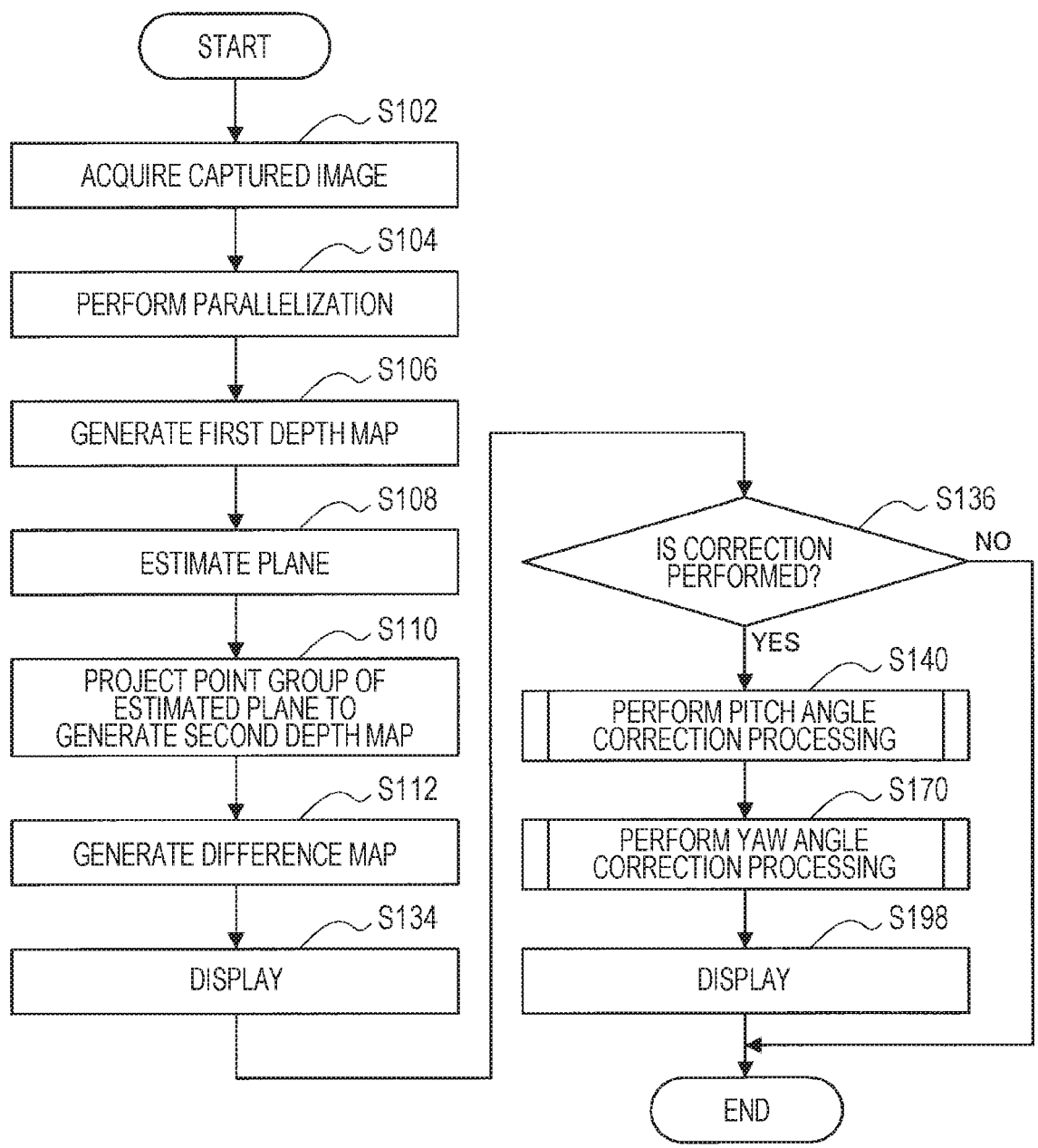
FIG. 7 is a flowchart illustrating an operation example of the information processing apparatus 1 according to the present embodiment.

Subsequently, an operation example of the information processing apparatus 1 according to the present embodiment is now described. FIG. 7 is a flowchart illustrating the operation example of the information processing apparatus 1 according to the present embodiment. Moreover, a sequence of processing steps described below can be started on the basis of the user input via the operation unit 30, started simultaneously with the activation of the information processing apparatus 1, or started every predetermined period.

As illustrated in FIG. 7, the stereo camera 7 acquires captured images (R image and L image) by performing the image-capturing, and the interface unit 60 receives the captured images from the stereo camera 7 (S102).

Subsequently, the parallelization processor 11 performs the parallelization processing on the R image and the L image acquired in step S102 to reduce the vertical misalignment between the R image and the L image on the basis of the parameter stored in advance, and obtains a parallelized R image and a parallelized L image (S104). Subsequently, the depth map generator 12 generates a first depth map by the stereo matching using the parallelized R image and the parallelized L image obtained in step S104 (S106). Subsequently, the plane estimator 13 estimates a plane on the basis of the first depth map generated in step S106 (S108).

Subsequently, the comparator 152 of the correction unit 15 generates a second depth map by projecting a three-dimensional point group existing on the plane estimated in step S108 (S110). Furthermore, the comparator 152 subtracts the second depth map generated in step S110 from the first depth map generated in step S106 for each pixel to generate a difference map (S112).

Figure 8:
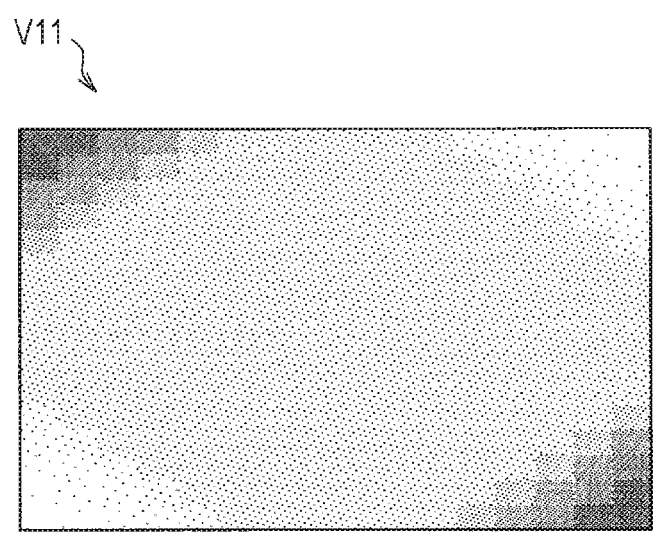
FIG. 8 is a diagram illustrating a display example in step S134.
Figure 8:
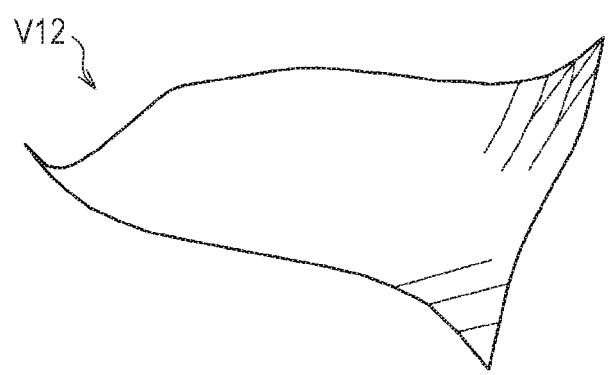

Subsequently, the display controller 17 causes the display unit 40 to display the difference map generated in step S112 or the first depth map. (S134). A display example in step S134 is now described with reference to FIG. 8. FIG. 8 is a diagram illustrating a display example in step S134.

As shown in a display example V11 illustrated in FIG. 8, the display controller 17 can cause the display unit 40 to display a difference map represented by visual features or the like such as color, brightness, and shading depending on a value (difference value) of each pixel. Moreover, in the display example V11 illustrated in FIG. 8, in one example, the difference value is represented by the shading of dots, and the color is darker as the difference value is positively larger and the color is lighter as the difference value is negatively larger.

Alternatively, the display controller 17 can cause the display unit 40 to display the three-dimensional point group obtained from the first depth map by drawing it in a three-dimensional manner as shown in a display example V12 illustrated in FIG. 8.

The display as illustrated in FIG. 8 makes it possible for the user to check whether the first depth map generated by the current parameter is distorted or not.

The description continues referring back to FIG. 7. The user who has checked the display in step S134 performs an input regarding whether or not to perform correction via the operation unit 30, and the correction controller 156 determines whether or not to perform correction on the basis of such user input (S136). In a case where no correction is performed (NO in S136), the processing ends.

Figure 9:
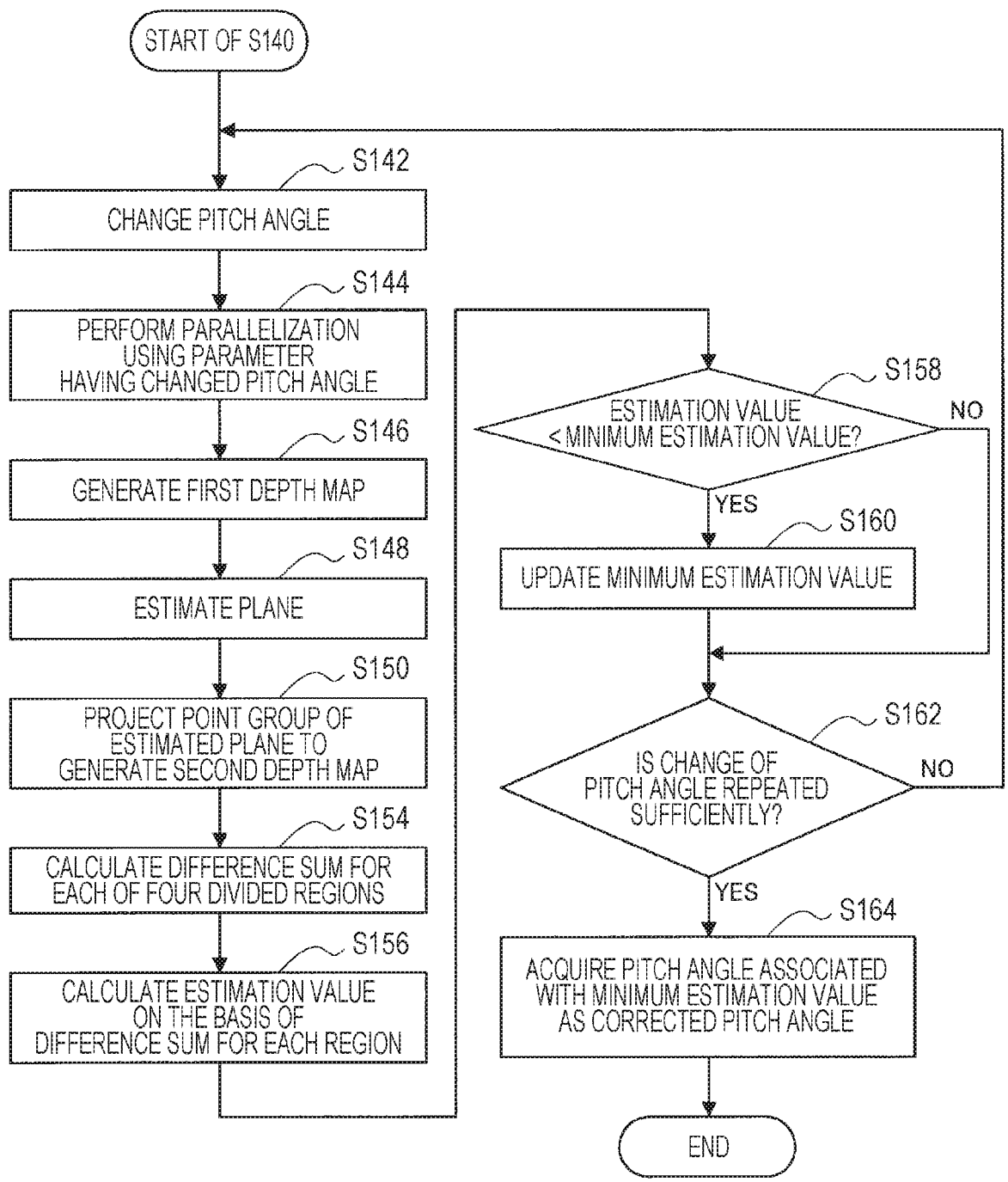
FIG. 9 is a flowchart illustrating a detailed operation of the pitch angle correction processing.

On the other hand, in a case where the correction is performed (YES in S136), pitch angle correction processing is performed (S140). The pitch angle correction processing in step S140 is now described in detail with reference to FIG. 9. FIG. 9 is a flowchart illustrating the detailed operation of the pitch angle correction processing.

As illustrated in FIG. 9, first, the correction controller 156 of the correction unit 15 changes the pitch angle (S142). In step S142, the correction controller 156 can change only the pitch angle, for example, among the current parameters (parameters stored in advance in the storage unit 50). Alternatively, as described above, the correction controller 156 can change, in addition to the change in the pitch angle, a parameter regarding the position of the viewpoint in the vertical direction depending on the changed pitch angle so that there is no vertical misalignment (to prevent the vertical center point from moving).

Subsequently, the parallelization processor 11 performs the parallelization processing on the R image and the L image acquired in step S102 in FIG. 7 on the basis of the parameter that includes the pitch angle after changed in step S142, and obtains a parallelized R image and a parallelized L image (S144). Subsequently, the depth map generator 12 generates a first depth map by the stereo matching using the parallelized R image and the parallelized L image obtained in step S144 (S146). Subsequently, the plane estimator 13 estimates a plane on the basis of the first depth map generated in step S146 (S148).

Subsequently, the comparator 152 of the correction unit 15 generates a second depth map by projecting the three-dimensional point group existing on the plane estimated in step S148 (S150). Furthermore, the comparator 152 calculates the sum of the differences (difference sum) of the second depth map generated in step S150 from the first depth map generated in step S146 for each of the regions divided into four by the horizontal centerline and the vertical centerline (S154). Furthermore, the comparator 152 calculates an estimation value (the first estimation value) as shown in Formula (1) above on the basis of the difference sum calculated for each region (S156).

Subsequently, the correction controller 156 compares the estimation value calculated in step S156 with the minimum estimation value (S158). Moreover, in a case where step S158 is executed for the first time, the minimum estimation value can be set to a very large value or the estimation value calculated upon the execution of step S156 for the first time can be set to the minimum estimation value. The minimum estimation value can be temporarily stored, for example, in the storage unit 50.

If the estimation value calculated in step S156 is smaller than the minimum estimation value (YES in S158), the correction controller 156 updates the minimum estimation value with the estimation value calculated in step S156 (S160). For example, in a case where the minimum estimation value is stored in the storage unit 50 as described above, in step S160, the correction controller 156 stores the estimation value calculated in step S156 in the storage unit 50 as the minimum estimation value. In addition, in step S160, the correction controller 156 can store the pitch angle changed in step S142 as a pitch angle associated with the minimum estimation value in the storage unit 50.

In step S162, the correction controller 156 performs control so that the processing in steps S142 to S160 is repeated until it is determined that the change of the pitch angle is sufficiently repeated. Moreover, the correction controller 156 can determine that the change of the pitch angle is sufficiently repeated, for example, in a case where the processing of steps S142 to S160 is repeated a predetermined number of times. If it is determined that the change of the pitch angle is sufficiently repeated (YES in S162), the processing proceeds to step S164.

In step S164, the correction controller 156 specifies the pitch angle associated with the minimum estimation value as the corrected pitch angle and acquires it from, for example, the storage unit 50.

Figure 10:
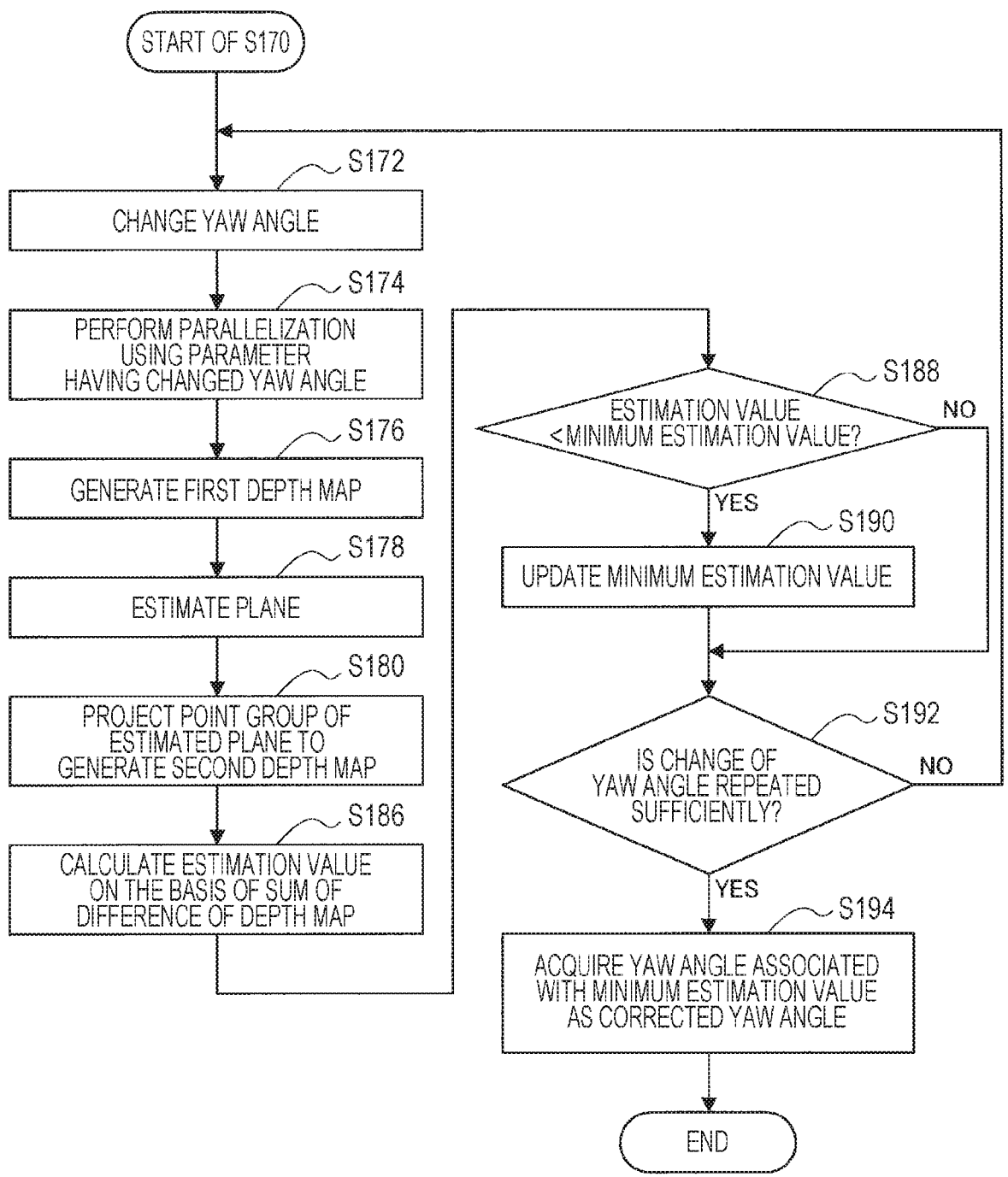
FIG. 10 is a flowchart illustrating a detailed operation of the yaw angle correction processing.

The pitch angle correction processing in step S140 is described above. The description continues referring back to FIG. 7. The yaw angle correction processing is performed following the pitch angle correction processing in step S140 (S170). The yaw angle correction processing in step S170 is now described in detail with reference to FIG. 10. FIG. 10 is a flowchart illustrating the detailed operation of the yaw angle correction processing.

As illustrated in FIG. 10, first, the correction controller 156 of the correction unit 15 changes the yaw angle (S172). In step S172, the correction controller 156 can change only the yaw angle, for example, among the current parameters (parameters subjected to the pitch angle correction processing in step S140).

Subsequently, the parallelization processor 11 performs the parallelization processing on the R image and the L image acquired in step S102 in FIG. 7 on the basis of the parameter that includes the yaw angle after changed in step S172, and obtains a parallelized R image and a parallelized L image (S174). Subsequently, the depth map generator 12 generates a first depth map by the stereo matching using the parallelized R image and the parallelized L image obtained in step S144 (S176). Subsequently, the plane estimator 13 estimates a plane on the basis of the first depth map generated in step S146 (S178).

Subsequently, the comparator 152 of the correction unit 15 generates a second depth map by projecting the three-dimensional point group existing on the plane estimated in step S148 (S180). Furthermore, the comparator 152 calculates the variance of the differences of the second depth map generated in step S180 from the first depth map generated in step S176 as an estimated value (the second estimation value) (S186).

Subsequently, the correction controller 156 compares the estimation value calculated in step S186 with the minimum estimation value (S188). Moreover, in a case where step S188 is executed for the first time, the minimum estimation value can be set to a very large value or the estimation value calculated upon the execution of step S186 for the first time can be set to the minimum estimation value. The minimum estimation value can be temporarily stored, for example, in the storage unit 50.

If the estimation value calculated in step S186 is smaller than the minimum estimation value (YES in S188), the correction controller 156 updates the minimum estimation value with the estimation value calculated in step S186 (S190). For example, in a case where the minimum estimation value is stored in the storage unit 50 as described above, in step S190, the correction controller 156 stores the estimation value calculated in step S186 in the storage unit 50 as the minimum estimation value. In addition, in step S190, the correction controller 156 can store the yaw angle changed in step S172 as a yaw angle associated with the minimum estimation value in the storage unit 50.

In step S192, the correction controller 156 performs control so that the processing in steps S172 to S190 is repeated until it is determined that the change of the yaw angle is sufficiently repeated. Moreover, the correction controller 156 can determine that the change of the yaw angle is sufficiently repeated, for example, in a case where the processing of steps S172 to S190 is repeated a predetermined number of times. If it is determined that the change of the yaw angle is sufficiently repeated (YES in S192), the processing proceeds to step S194.

In step S194, the correction controller 156 specifies the yaw angle associated with the minimum estimation value as the corrected yaw angle and acquires it from, for example, the storage unit 50.

The pitch angle correction processing in step S170 is described above. The description continues referring back to FIG. 7. In subsequent step S198, the display controller 17 causes the corrected difference map or the corrected first depth map to be displayed (S198). The difference map or the first depth map can be obtained, for example, by performing the processing similar to that in steps S102 to S112 again using the corrected parameters, or can be obtained during the yaw angle correction processing (S170).

Figure 11:
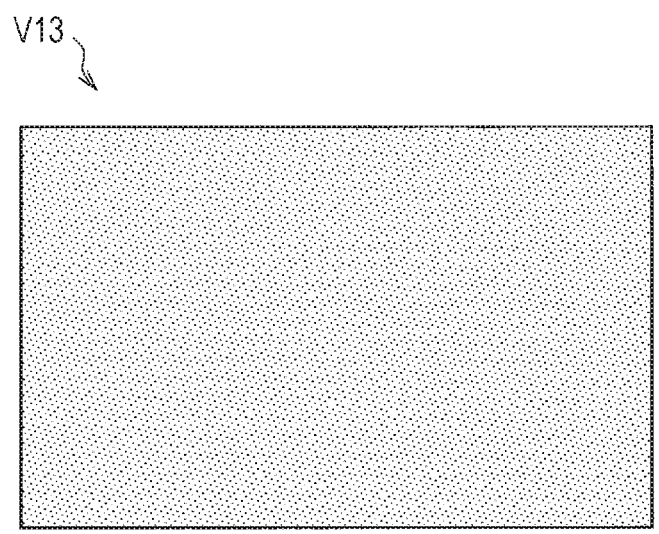
FIG. 11 is a diagram illustrating a display example in step S198.
Figure 11:
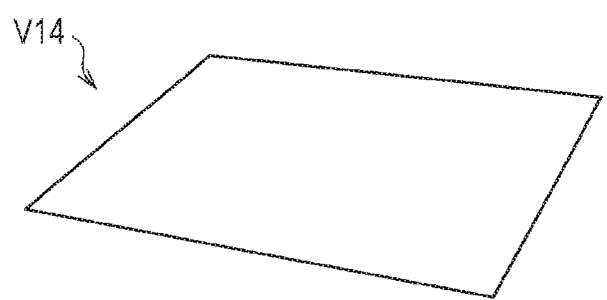

A display example in step S198 is now described with reference to FIG. 11. FIG. 11 is a diagram illustrating a display example in step S198.

A display example V13 illustrated in FIG. 11 is an example in which a difference map represented by features like visual features (shading in the example of FIG. 11) or the like such as color, brightness, and shading depending on a value (difference value) of each pixel is displayed on the display unit 40, which is similar to the display example V11 illustrated in FIG. 8.

Further, a display example V14 illustrated in FIG. 11 is an example in which the three-dimensional point group obtained from the first depth map generated using the corrected parameter is displayed by drawing it in a three-dimensional manner on the display unit 40, which is similar to the display example V12 illustrated in FIG. 8.

The display as illustrated in FIG. 11 makes it possible for the user to check that the parameter has been corrected.

(Effect)

The first embodiment of the present disclosure is described above. The present embodiment allows a parameter regarding the pitch angle and the yaw angle between the viewpoints to be corrected on the basis of the comparison of the first depth map generated by stereo matching with the second depth map, the second depth map being obtained by projecting the plane estimated on the basis of the first depth map. Although it is difficult to correct the pitch angle and the yaw angle on the basis of the matching error of the stereo matching as described above, the present embodiment makes it possible to correct the pitch angle and the yaw angle in consideration of the distortion occurring in the depth map.

2-2. Second Embodiment (Overview)

Figure 12:
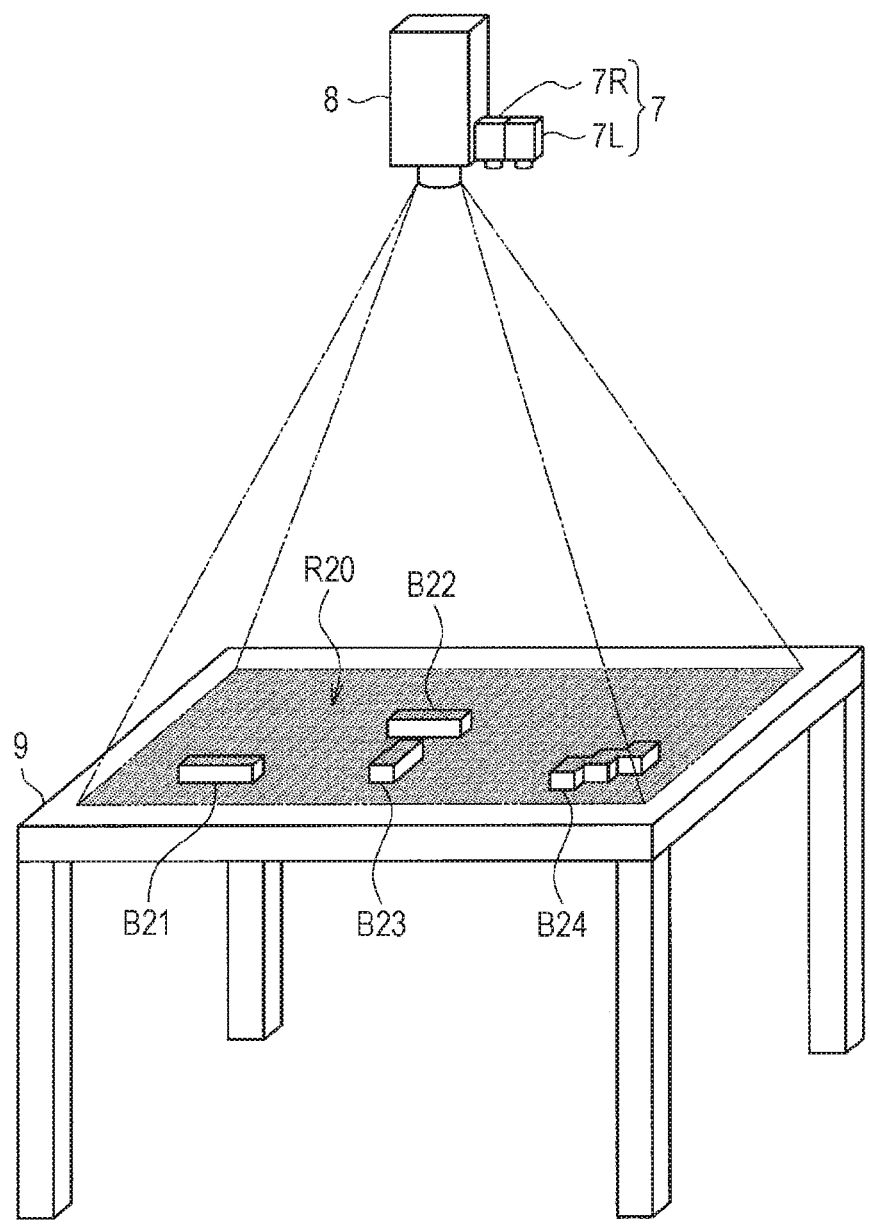
FIG. 12 is a diagram illustrated to describe an overview of a second embodiment of the present disclosure.

Subsequently, a second embodiment of the present disclosure is now described. FIG. 12 is a diagram illustrated to describe an overview of the second embodiment of the present disclosure. The information processing system according to the second embodiment of the present disclosure includes, as illustrated in FIG. 12, a stereo camera 7, a projector 8, and an information processing apparatus that is not illustrated in FIG. 12. Note that, the stereo camera 7 and the projector 8 illustrated in FIG. 12 are similar in configuration to the stereo camera 7 and the projector 8 illustrated in FIG. 1 Thus, detailed description thereof is omitted.

The first embodiment described above is made on the assumption that no unnecessary object is placed on the top surface of the table 9 illustrated in FIG. 1. On the other hand, in the example illustrated in FIG. 12, objects B21 to B24 exist on the top surface of a table 9. Moreover, in the example illustrated in FIG. 12, the objects B21 to B24 are included in a projection region R20 of the projector 8 and are also included in an overlapping portion (not shown) between the image-capturing ranges of a right camera 7R and a left camera 7L.

In the case as illustrated in FIG. 12, in the first embodiment, it is necessary to remove the objects B21 to B24. On the other hand, in the second embodiment of the present disclosure described below, even if an unnecessary object is placed on the top surface of the table 9, it is possible to correct a parameter regarding the attitude between viewpoints. A configuration example of an information processing apparatus (hereinafter also referred to as an information processing apparatus according to the present embodiment) included in the information processing system according to the present embodiment for achieving such an effect is now described.

(Configuration Example of Information Processing Apparatus)

Figure 13:
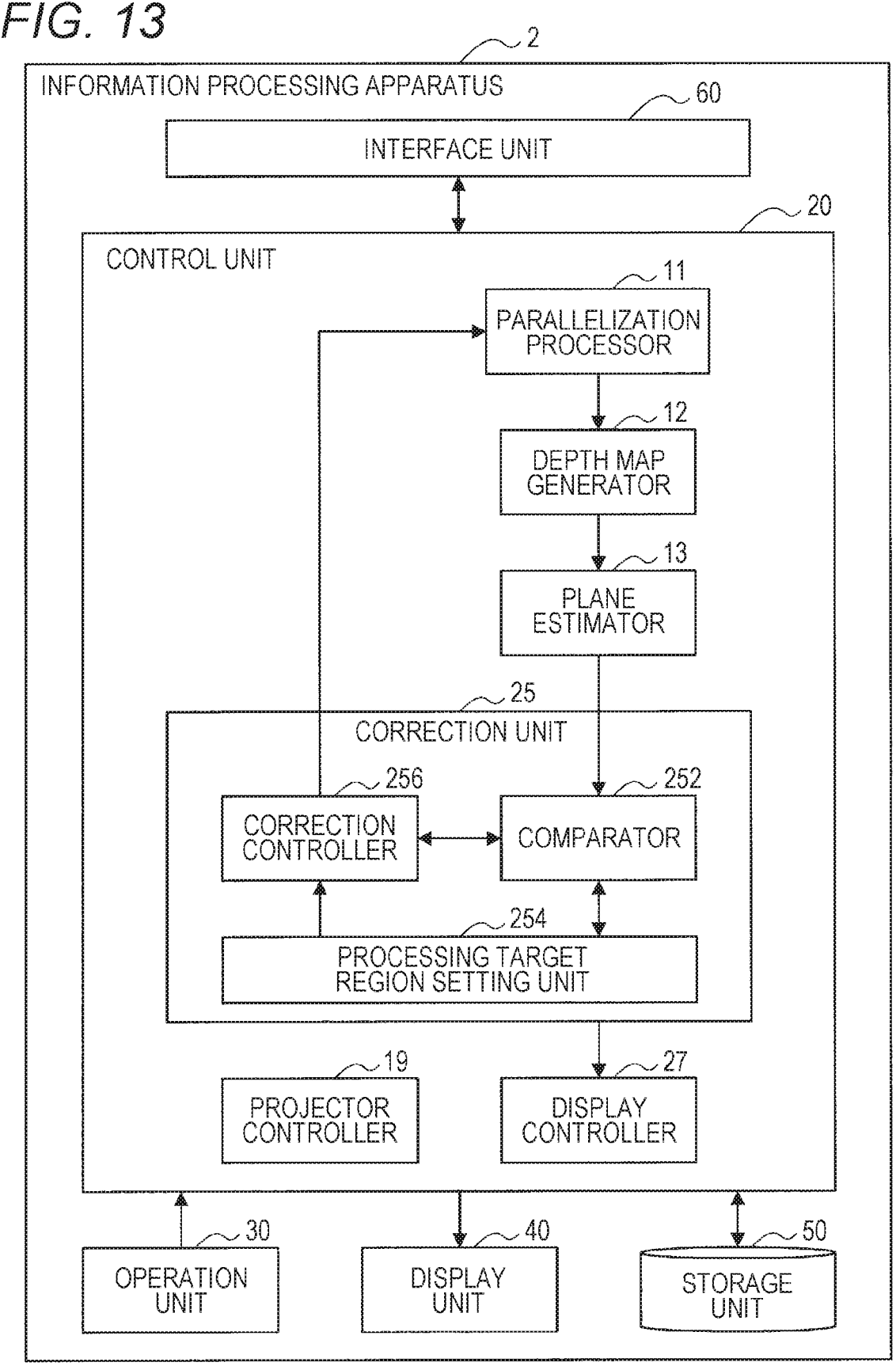
FIG. 13 is a block diagram illustrating a configuration example of an information processing apparatus 2 according to the present embodiment.

FIG. 13 is a block diagram illustrating a configuration example of an information processing apparatus 2 according to the present embodiment. As illustrated in FIG. 13, the information processing apparatus 2 according to the present embodiment includes a control unit 20, an operation unit 30, a display unit 40, a storage unit 50, and an interface unit 60. Moreover, the operation unit 30, the display unit 40, the storage unit 50, and the interface unit 60 illustrated in FIG. 13 are substantially similar in configuration to the operation unit 30, the display unit 40, the storage unit 50, and the interface unit 60 described with reference to FIG. 2. Thus, the detailed description thereof is omitted.

The control unit 20 illustrated in FIG. 13 controls each component of the information processing apparatus 2. In addition, the control unit 20 also functions as a parallelization processor 11, a depth map generator 12, a plane estimator 13, a correction unit 25, a display controller 27, and a projector controller 19 as illustrated in FIG. 13. Moreover, the parallelization processor 11, the depth map generator 12, the plane estimator 13, and the projector controller 19 illustrated in FIG. 13 are substantially similar in configuration to the parallelization processor 11, the depth map generator 12, the plane estimator 13, and the projector controller 19 described with reference to FIG. 2. Thus, the detailed description thereof is omitted.

The correction unit 25 according to the present embodiment corrects a parameter regarding the attitude of the right camera 7R and the left camera 7L on the basis of the comparison the depth map generated by the depth map generator 12 with the plane estimated by the plane estimator 13, which is similar to the correction unit 15 according to the first embodiment. However, as described above, in the present embodiment, there is a possibility that an unnecessary object is placed on the top surface (image-capturing range) of the table 9. Thus, the correction unit 25 according to the present embodiment sets a processing target region so as not to be affected by such an object, and performs processing relating to correction in the processing target region. The correction unit 25 according to the present embodiment is different in this respect from the correction unit 15 according to the first embodiment. The correction unit 25 according to the present embodiment is now described mainly with respect to differences from the correction unit 15 according to the first embodiment, and the description of similar parts will be omitted as appropriate.

As illustrated in FIG. 13, the correction unit 25 according to the present embodiment includes a comparator 252, a processing target region setting unit 254, and a correction controller 256.

The comparator 252 compares the first depth map generated by the depth map generator 12 with the second depth map generated on the basis of the estimated plane, which is similar to the comparator 152 according to the first embodiment.

However, the comparator 252 according to the present embodiment provides a difference map generated by subtracting the second depth map from the first depth map for each pixel to the processing target region setting unit 254.

Furthermore, after the processing target region setting unit 254 sets the processing target region, the comparator 252 compares the first depth map in the processing target region with the estimated plane.

For example, after the processing target region setting unit 254 sets the processing target region, the comparator 252 can generate the difference map by subtracting the second depth map from the first depth map for each pixel in the processing target region and provide it to the correction controller 256.

Further, the comparator 252 can calculate the first estimation value used to correct the pitch angle and the second estimation value used to correct the yaw angle by comparing the first depth map with the second depth map in the processing target region. The method of calculating the first estimation value and the second estimation value by the comparator 252 can be similar to the method of calculating the first estimation value and the second estimation value described in the first embodiment, except for setting only the processing target region that is set by the processing target region setting unit 254 as the calculation target.

Such a configuration makes it possible for the comparator 252 to calculate the first estimation value and the second estimation value without being affected by an object placed on the top surface of the table 9.

The processing target region setting unit 254 sets the processing target region on the basis of the first depth map and the second depth map. The processing target region setting unit 254 provides information regarding the set processing target region to the comparator 252 and the correction controller 256.

As described above, in the present embodiment, an object may be placed on the top surface of the table 9. Thus, the processing target region setting unit 254 desirably sets the processing target region so that the estimation value calculated by the comparator 252 can be prevented from being affected by such an object. Thus, the processing target region setting unit 254 specifies an object region where an object exists and sets the processing target region on the basis of the object region. For example, the processing target region setting unit 254 specifies, as the object region, a region where the absolute value of the difference between the first depth map and the second depth map is larger than a predetermined threshold.

To prevent the estimation value calculated by the comparator 252 from being affected by such an object, for example, it is conceivable to remove the object region from the processing target region. In this case, the absolute value of the difference between the difference sums is calculated for each of the upper and lower regions, and the sum of the calculated absolute values is used as the first estimation value as described with reference to FIGS. 3 to 6. Thus, it is desirable that the area of the processing target region is the same for each of the upper and lower regions. Furthermore, as illustrated in FIG. 8, the first depth map generated in a case where there is misalignment in the pitch angle or yaw angle tends to have a larger error as it is closer to the four corners (the absolute value of the difference between the first depth map and the second depth map increases). Thus, to calculate the first estimation value more appropriately, the processing target region setting unit 254 can set the processing target region so that the processing target region is vertically symmetric.

For example, the processing target region setting unit 254 can generate a mask image excluding the object region described above and an inverted mask image obtained by inverting the mask image in the vertical direction. Furthermore, the processing target region setting unit 254 generates a vertically symmetrical mask image obtained by combining the mask image and the inverted mask image and can set the processing target region on the basis of the symmetrical mask image. Moreover, a specific example of the processing target region setting processing described above will be described later with reference to FIG. 16.

The correction controller 256 performs control relating to the correction processing on the parameter regarding the attitudes of the right camera 7R and the left camera 7L, which is similar to the correction controller 156 according to the first embodiment. However, the correction controller 256 according to the present embodiment is different from the correction controller 156 described above in that the control relating to the correction processing is performed on the basis of the first estimation value and the second estimation value, which are calculated by the comparator 252 on the basis of the processing target region that is set by the processing target region setting unit 254. Such a configuration makes it possible to perform the correction with higher accuracy without being affected by an unnecessary object.

Further, the correction controller 256 according to the present embodiment can determine whether or not the correction processing is capable of being executed on the basis of the processing target region that is set by the processing target region setting unit 254. For example, in a case where the processing target region does not exist sufficiently, there is a possibility that the correction processing is not performed normally. Accordingly, for example, in a case where the processing target region does not exist sufficiently, the correction controller 256 can determine that the correction processing is incapable of being executed. The case where the processing target region does not exist sufficiently can mean that, for example, the case where the area of the processing target region is smaller than a predetermined threshold. In addition, the first depth map generated in a case where the pitch angle or yaw angle contains misalignment has a larger error as it is closer to the four corners. Thus, the processing target region setting unit 254 can determine whether or not the processing target region exists sufficiently, on the basis of an estimation value obtained by estimating the target region by performing weighting such that the weight increases as it is closer to the four corners.

The display controller 27 controls the display of the display unit 40 in a similar manner to the display controller 17 according to the first embodiment. However, the display controller 27 according to the present embodiment is different from the display controller 17 in that the difference map in which the processing target region is set or the first depth map in which the processing target region is set is displayed. In addition, the display controller 27 according to the present embodiment can display a screen that notifies the user to remove an unnecessary object in a case where the correction controller 256 determines that the correction processing is incapable of being executed because the processing target region does not exist sufficiently.

(Operation Example)

Figure 14:
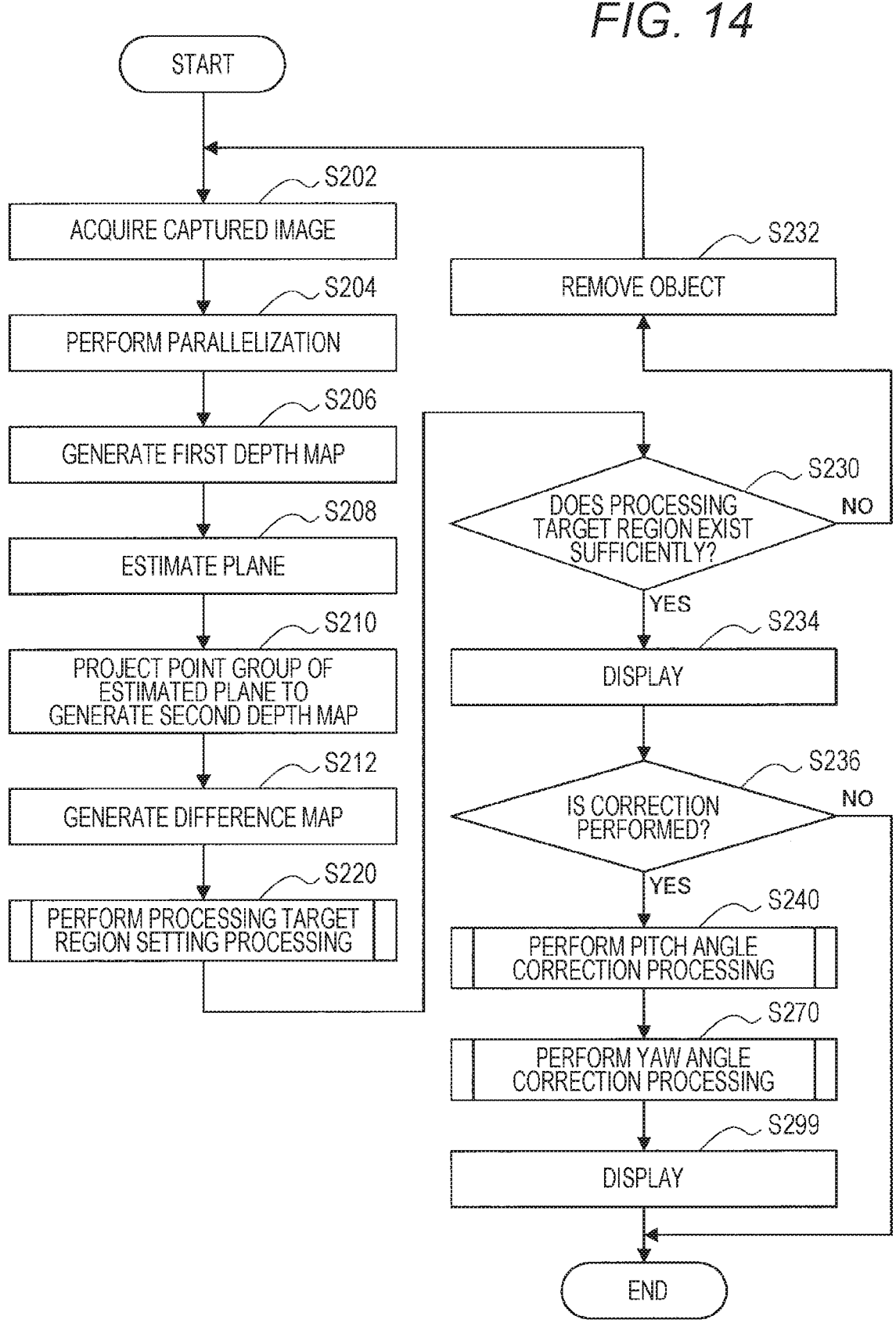
FIG. 14 is a flowchart illustrating an operation example of the information processing apparatus 2 according to the present embodiment.

The configuration examples of the information processing apparatus 2 according to the present embodiment are described above. Subsequently, an operation example of the information processing apparatus 2 according to the present embodiment is now described. FIG. 14 is a flowchart illustrating the operation example of the information processing apparatus 2 according to the present embodiment. Moreover, a sequence of processing steps described below can be started on the basis of the user input via the operation unit 30, started simultaneously with the activation of the information processing apparatus 2, or started every predetermined period.

The processing of steps S202 to S212 illustrated in FIG. 14 is similar to steps S102 to S112 described with reference to FIG. 7, and so the description thereof is omitted.

Figure 15:
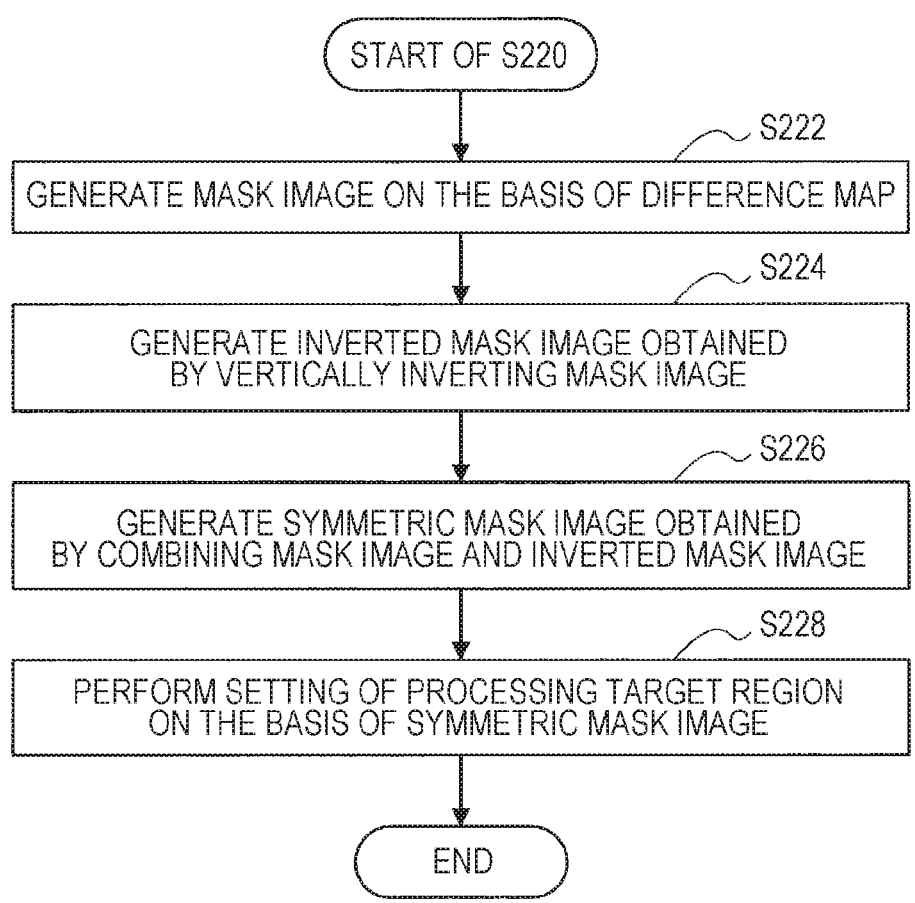
FIG. 15 is a flowchart illustrating a detailed operation of the processing target region setting processing.
Figure 16:
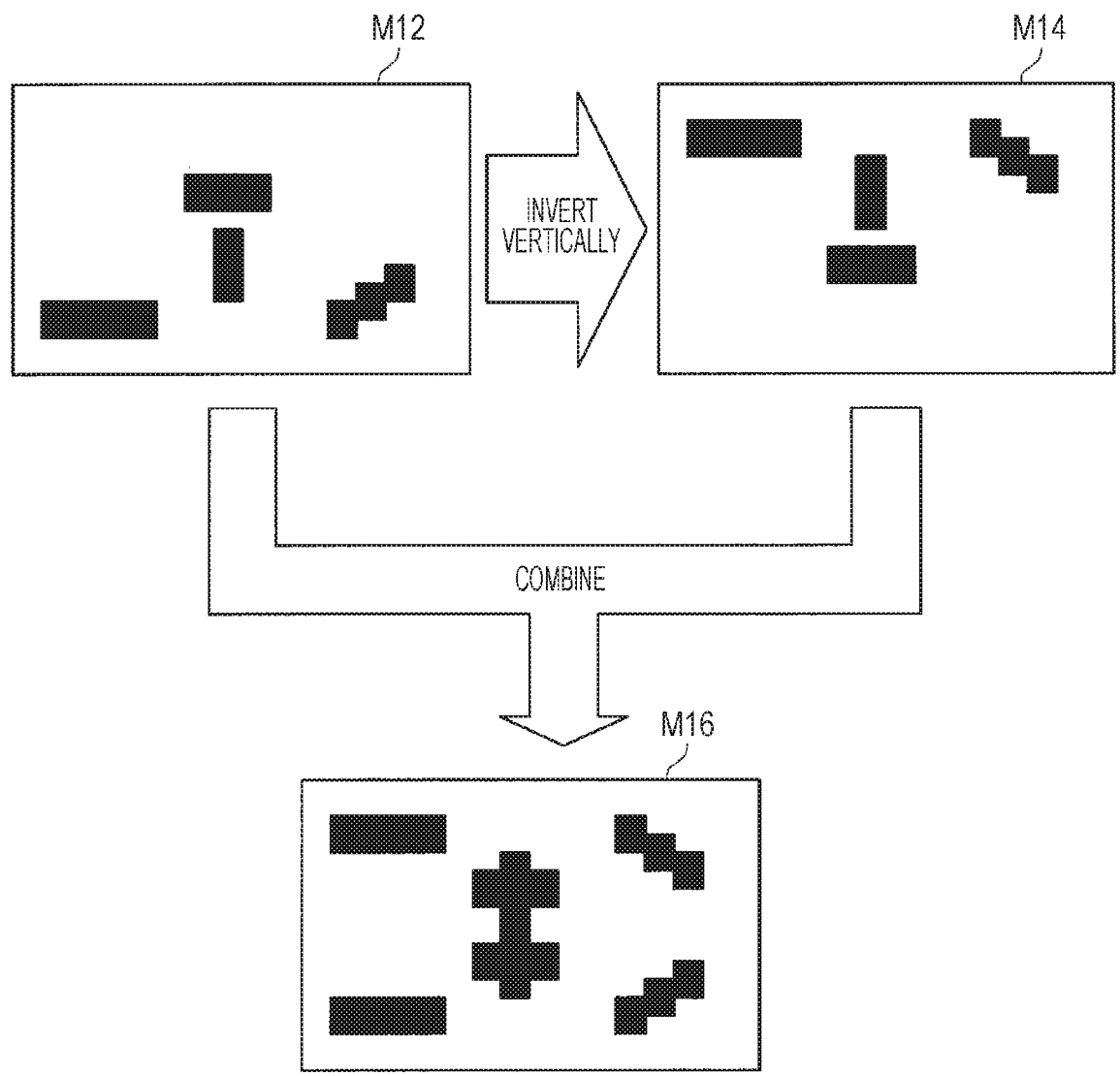
FIG. 16 is a diagram illustrated to describe a specific example of the processing target region setting processing.

In subsequent step S220, the processing target region setting unit 254 of the correction unit 25 sets the processing target region. The processing target region setting processing in step S220 is now described in detail with reference to FIGS. 15 and 16. FIG. 15 is a flowchart illustrating the detailed operation of the processing target region setting processing. In addition, FIG. 16 is a diagram illustrated to describe a specific example of the processing target region setting processing. The operation of the processing target region setting processing in step S220 is described referring to the flowchart of FIG. 15 with reference to a mask image M12, an inverted mask image M14, and a symmetric mask image M16 illustrated in FIG. 16. Moreover, in the example illustrated in FIG. 16, although the region to be removed (masked) is shown as a black region, the color of white and black can be reversed or other colors and the like can be used.

First, the processing target region setting unit 254 specifies an object region on the basis of the difference map generated in step S212 and generates the mask image M12 in which the object region is excluded (S222). Subsequently, the processing target region setting unit 254 generates the inverted mask image M14 obtained by vertically inverting the mask image M12 generated in step S222 (S224).

Then, the processing target region setting unit 254 combines the mask image M12 generated in step S222 and the inverted mask image M14 generated in step S224 to generate the symmetric mask image M16 (S226). Moreover, as illustrated in FIG. 16, in step S226, the processing target region setting unit 254 generates the symmetric mask image M16 so that the black region in at least one of the mask image M12 or the inverted mask image M14 is the black region also in the symmetric mask image M16.

The processing target region setting unit 254 sets the processing target region on the basis of the symmetric mask image M16 generated in step S226 (S228), as the last step. For example, in step S228, the processing target region setting unit 254 sets the white region of the symmetric mask image M16 as the processing target region.

The processing target region setting processing in step S220 is described above. The description continues referring back to FIG. 14. In subsequent step S232, the correction controller 256 of the correction unit 25 determines whether or not the processing target region exists sufficiently (S230).

If the processing target region does not exist sufficiently (NO in S230), the display controller 27 causes a screen for notifying the user to remove an unnecessary object to be displayed, and the user removes the unnecessary object placed on the top surface of the table 9 (S232). Then, the processing returns to step S202.

Figure 17:
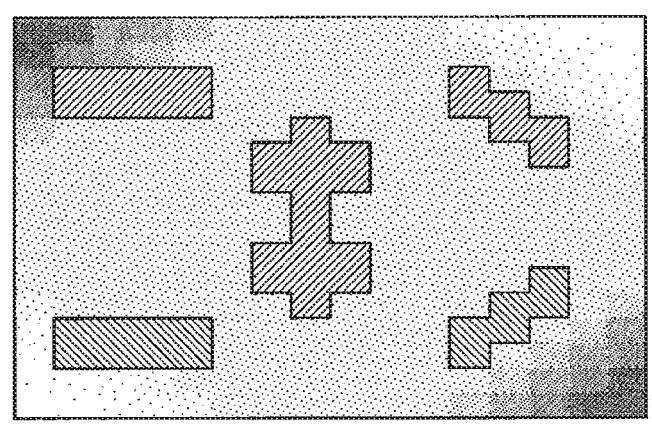
FIG. 17 is a diagram illustrating a display example in step S234.
Figure 17:
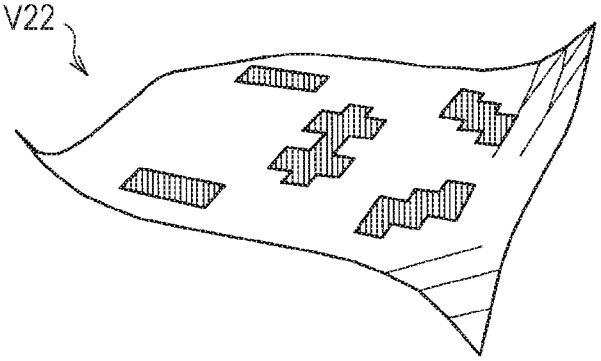

On the other hand, if the processing target region exists sufficiently (YES in S230), the display controller 27 causes the display unit 40 to display the difference map in which the processing target region is set or the first depth map in which the processing target region is set. (S234). A display example in step S234 is now described with reference to FIG. 17. FIG. 17 is a diagram illustrating a display example in step S234.

As shown in a display example V21 illustrated in FIG. 17, the display controller 27 can cause the display unit 40 to display a difference map represented by visual features or the like such as color, brightness, and shading depending on a value (difference value) of each pixel. Moreover, in the display example V21 illustrated in FIG. 17, in one example, the difference value is represented by the shading of dots, and the color is darker as the difference value is positively larger and the color is lighter as the difference value is negatively larger. In addition, the display example V21 illustrated in FIG. 17 represents the difference map in which the processing target region is set, and regions that are not processing target regions are indicated by oblique hatching. However, the present configuration is not limited to such an example, and for example, a region that is not the processing target region can be represented by other visual features such as color, luminance, and shading.

Alternatively, the display controller 27 can cause the display unit 40 to display a three-dimensional point group obtained from the first depth map by drawing it in a three-dimensional manner as shown in a display example V22 illustrated in FIG. 17. In addition, the display example V22 illustrated in FIG. 17 represents the first depth map in which the processing target region is set, and regions that are not the processing target region are indicated by oblique hatching. However, the present configuration is not limited to such an example, and for example, a region that is not the processing target region can be displayed by cutting it out or can be displayed in a different color from the processing target region.

The display as illustrated in FIG. 17 makes it possible for the user to check whether or not the first depth map generated by the current parameter is distorted as well as to check the processing target region.

The description continues referring back to FIG. 14. The user who has checked the display in step S234 performs an input regarding whether or not to perform correction via the operation unit 30, and the correction controller 256 determines whether or not to perform correction on the basis of the user input (S236). If no correction is made (NO in S236), the processing ends.

Figure 18:
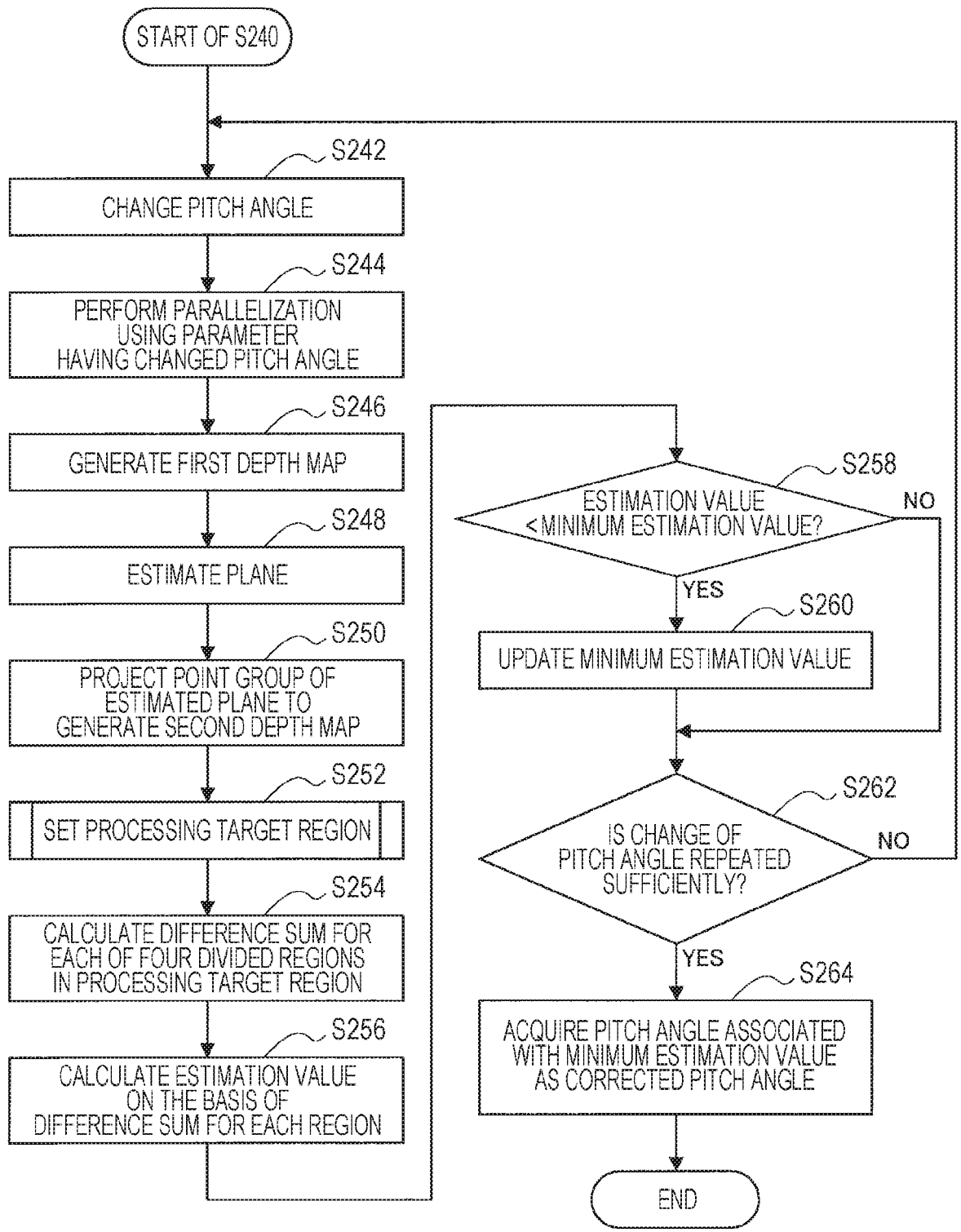
FIG. 18 is a flowchart illustrating a detailed operation of the pitch angle correction processing.

On the other hand, if the correction is performed (YES in S236), pitch angle correction processing is performed (S240). The pitch angle correction processing in step S240 is now described in detail with reference to FIG. 18. FIG. 18 is a flowchart illustrating the detailed operation of the pitch angle correction processing.

The processing of steps S242 to S250 illustrated in FIG. 18 is similar to steps S142 to S150 described with reference to FIG. 9, and so the description thereof is omitted.

In subsequent step S252, the processing target region setting unit 254 sets the processing target region. The processing of step S252 is similar to the processing of step S220 except that the difference map generated on the basis of the first depth map generated in step S246 and the second depth map generated in step S250 is used. Thus, the detailed description is omitted.

In subsequent step S254, the comparator 252 targets the processing target region that is set in step S252, and calculates a sum of differences (difference sum) of the second depth map generated in step S250 from the first depth generated in step S246 for each region divided into four by the horizontal centerline and the vertical centerline.

The processing of subsequent steps S256 to S264 is similar to steps S156 to S164 described with reference to FIG. 9, and so the description thereof is omitted.

Figure 19:
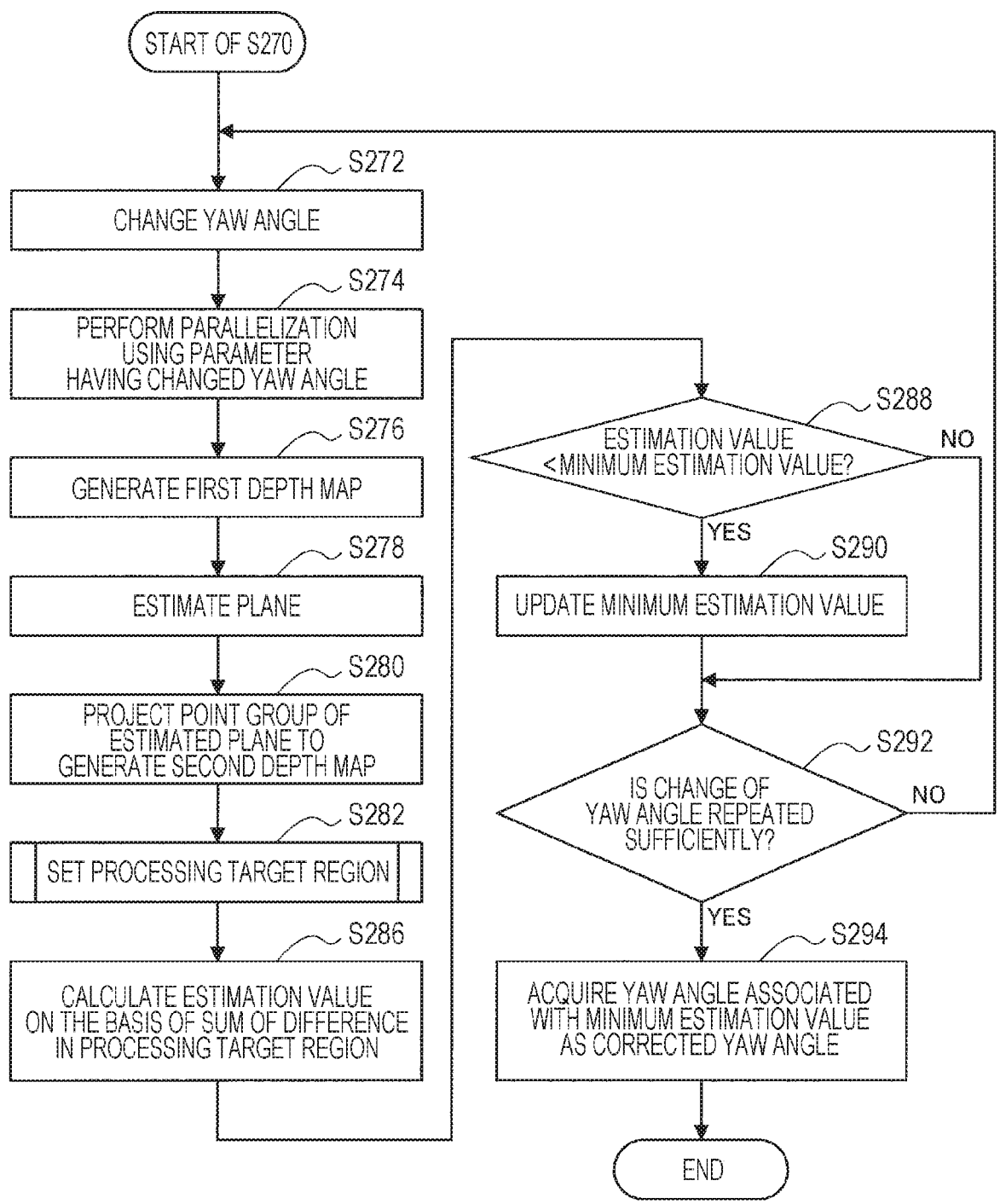
FIG. 19 is a flowchart illustrating a detailed operation of the yaw angle correction processing.

The pitch angle correction processing in step S240 is described above. The description continues referring back to FIG. 14. The yaw angle correction processing is performed following the pitch angle correction processing in step S240 (S270). The yaw angle correction processing in step S270 is now described in detail with reference to FIG. 19. FIG. 19 is a flowchart illustrating the detailed operation of the yaw angle correction processing.

The processing of steps S272 to S280 illustrated in FIG. 19 is similar to steps S172 to S180 described with reference to FIG. 10, and so the description thereof is omitted.

In subsequent step S282, the processing target region setting unit 254 sets the processing target region. The processing of step S282 is similar to the processing of step S220 except that the difference map generated on the basis of the first depth map generated in step S276 and the second depth map generated in step S270 is used. Thus, the detailed description is omitted.

In subsequent step S286, the comparator 252 targets the processing target region that is set in step S282, and the sum of differences of the second depth map generated in step S280 from the first depth map generated in step S276 as an estimation value (the second estimation value).

The processing of subsequent steps S288 to S294 is similar to steps S188 to S194 described with reference to FIG. 10, and so the description thereof is omitted.

The pitch angle correction processing in step S270 is described above. The description continues referring back to FIG. 14. In subsequent step S298, the display controller 27 causes the corrected difference map in which the processing target region is set or the corrected first depth map in which the processing target region is set to be displayed (S299).

(Effect)

The second embodiment of the present disclosure is described above. The present embodiment makes it possible to perform the correction with high accuracy even in a case where an unnecessary object exists on the top surface (image-capturing range) of the table 9 by setting the processing target region.

3. Modifications

Each of the embodiments of the present disclosure has been described above. Hereinbelow, several modified examples of each embodiment of the present disclosure will be described. Note that each of the modified examples that will be described below may be singly applied to each embodiment of the present disclosure, or may be applied to each embodiment of the present disclosure in combination thereof. In addition, each modified example may be applied instead of the configuration described in each embodiment of the present disclosure, or additionally applied to the configuration described in each embodiment of the present disclosure.

3-1. First Modification

Although the above description is given of the example of arranging the stereo camera 7 including the right camera 7R and the left camera 7L arranged horizontally so that the top surface of the table 9 on which the image is projected by the projector 8 is the image-capturing range, the present technology is not limited to such an example. The present technology is applicable in a wider variety of situations.

For example, if there is a plane (e.g., top surface of a table, a floor, a wall and so on) in the most part of the imaging range, and the plane contains features suitable for stereo matching, such as characteristic points, textures, and feature points, the projection of an image by the projector may not necessarily be performed.

Further, although the above description is given of the example in which a plurality of image-capturing devices (the right camera 7R and the left camera 7L) is arranged in the horizontal direction, the present technology is not limited to such an example. For example, the present technology is also applicable to a plurality of captured images acquired by a plurality of image-capturing devices arranged in the vertical direction. In such a case, the search direction for the corresponding points in stereo matching can be the vertical direction. In addition, in such a case, the method of calculating the estimation value used to correct the pitch angle and the method of calculating the estimation value used to correct the yaw angle can be appropriately replaced with each other. Similarly, the method of correcting the pitch angle and the method of correcting the yaw angle can be appropriately replaced with each other. Moreover, in a case where the vertical direction and horizontal direction of the image-capturing device or the captured image are not particularly defined, for example, the search direction for the corresponding points in stereo matching can be defined as the horizontal direction.

Further, a plurality of captured images can be images acquired at different times by a moving image-capturing device instead of images simultaneously acquired by a plurality of image-capturing devices. For example, the present technology is also applicable to a plurality of captured images acquired at different times by a moving image-capturing device. In such a case, the attitude of the image-capturing device at the time when the moving image-capturing device acquires each captured image (when the image-capturing is performed) is the attitude of the viewpoint to be corrected, and the pitch angle or the yaw angle between the times can be corrected.

3-2. Second Modification

Further, although the above description is given of the example of the method of calculating the first estimation value used to correct the pitch angle and the method of calculating the second estimation value used to correct the yaw angle, it is also possible to calculate the estimation value by employing other methods.

For example, the first estimation value or the second estimation value can be calculated by adding the absolute values of the differences between the first depth map calculated for each pixel and the second depth map. Even with such a calculation method, it is possible to calculate an estimation value that is not affected by cancellation due to regions having different signs as described with reference to FIGS. 4 to 6.

4. Hardware Configuration Example

Figure 20:
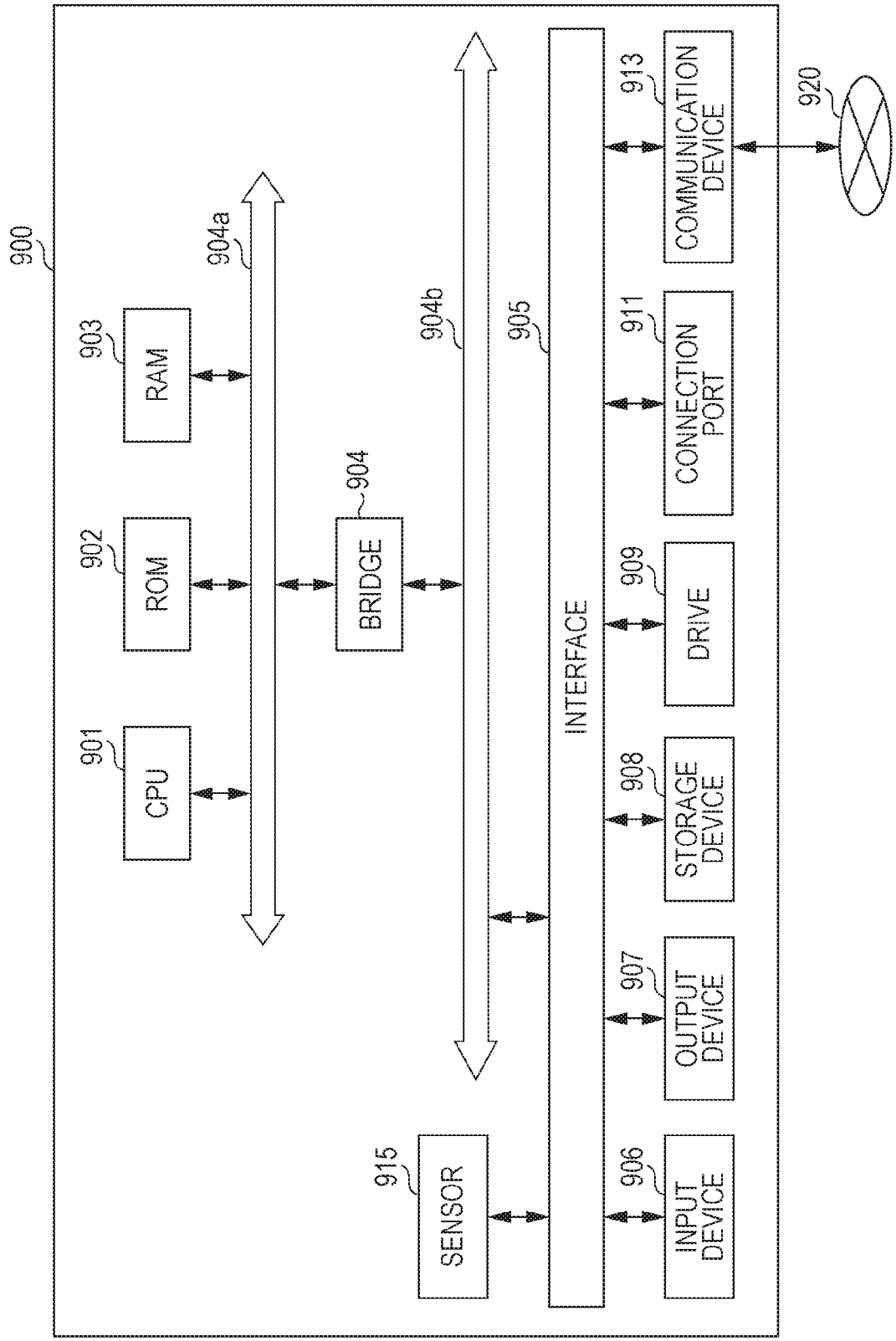
FIG. 20 is a block diagram illustrating a hardware configuration example.

The embodiment of the present disclosure has been described above. Last of all, with reference to FIG. 20, a hardware configuration of the information processing apparatus according to the embodiment of the present disclosure will be described. FIG. 20 is a block diagram illustrating an example of a hardware configuration of an information processing apparatus according to the embodiment of the present disclosure. Note that, for example, an information processing apparatus 900 illustrated in FIG. 20 may implement the information processing apparatus 1 and the information processing apparatus 2, each illustrated respectively in FIG. 2 and FIG. 13. The information processes performed by the information processing apparatus 1 and the information processing apparatus 2 according to the embodiment of the present disclosure are implemented by operating cooperatively software and hardware which will be described later.

As illustrated in FIG. 20, the information processing apparatus 900 includes a central processing unit (CPU) 901, a read only memory (ROM) 902, a random access memory (RAM) 903, and a host bus 904*a*. In addition, the information processing apparatus 900 includes a bridge 904, an external bus 904*b*, an interface 905, an input device 906, an output device 907, a storage device 908, a drive 909, a connection port 911, a communication device 913, and a sensor 915. The information processing apparatus 900 may include a processing circuit such as a DSP or an ASIC instead of or along with the CPU 901.

The CPU 901 functions as an arithmetic processing device and a control device and controls the overall operation in the information processing apparatus 900 according to various programs. Further, the CPU 901 may be a microprocessor. The ROM 902 stores programs, operation parameters, and the like used by the CPU 901. The RAM 903 temporarily stores programs used in execution of the CPU 901, parameters appropriately changed in the execution, and the like. The CPU 901 may form the control unit 10 and the control unit 20, for example.

The CPU 901, the ROM 902, and the RAM 903 are connected by the host bus 904*a* including a CPU bus and the like. The host bus 904*a* is connected with the external bus 904*b* such as a peripheral component interconnect/interface (PCI) bus via the bridge 904. Further, the host bus 904*a*, the bridge 904, and the external bus 904*b* are not necessarily separately configured and such functions may be mounted in a single bus.

The input device 906 is realized by a device through which a user inputs information, such as a mouse, a keyboard, a touch panel, a button, a microphone, a switch, and a lever, for example. In addition, the input device 906 may be a remote control device using infrared ray or other electric waves, or external connection equipment such as a cellular phone or a PDA corresponding to an operation of the information processing apparatus 900, for example. Furthermore, the input device 906 may include an input control circuit or the like which generates an input signal on the basis of information input by the user using the aforementioned input means and outputs the input signal to the CPU 901, for example. The user of the information processing apparatus 900 may input various types of data or order a processing operation for the information processing apparatus 900 by operating the input device 906.

The output device 907 is formed by a device that may visually or aurally notify the user of acquired information. As such devices, there are a display device such as a CRT display device, a liquid crystal display device, a plasma display device, an EL display device, or a lamp, a sound output device such as a speaker and a headphone, a printer device, and the like. The output device 907 outputs results acquired through various processes performed by the information processing apparatus 900, for example. Specifically, the display device visually displays results acquired through various processes performed by the information processing apparatus 900 in various forms such as text, images, tables, and graphs. On the other hand, the sound output device converts audio signals including reproduced sound data, audio data, and the like into analog signals and aurally outputs the analog signals. The output device 907 may form the display unit 40, for example.

The storage device 908 is a device for data storage, formed as an example of a storage unit of the information processing apparatus 900. For example, the storage device 908 is realized by a magnetic storage device such as an HDD, a semiconductor storage device, an optical storage device, a magneto-optical storage device, or the like. The storage device 908 may include a storage medium, a recording device for recording data on the storage medium, a reading device for reading data from the storage medium, a deletion device for deleting data recorded on the storage medium, and the like. The storage device 908 stores programs and various types of data executed by the CPU 901, various types of data acquired from the outside, and the like. The storage device 908 may form the storage unit 50, for example.

The drive 909 is a reader/writer for storage media and is included in or externally attached to the information processing apparatus 900. The drive 909 reads information recorded on a removable storage medium such as a magnetic disc, an optical disc, a magneto-optical disc, or a semiconductor memory mounted thereon, and outputs the information to the RAM 903. In addition, the drive 909 may write information on the removable storage medium.

The connection port 911 is an interface connected with external equipment and is a connector to the external equipment through which data may be transmitted through a universal serial bus (USB) and the like, for example.

The communication device 913 is a communication interface formed by a communication device for connection to a network 920 or the like, for example. The communication device 913 is a communication card or the like for a wired or wireless local area network (LAN), long term evolution (LTE), Bluetooth (registered trademark), or wireless USB (WUSB), for example. In addition, the communication device 913 may be a router for optical communication, a router for asymmetric digital subscriber line (ADSL), various communication modems, or the like. For example, the communication device 913 may transmit/receive signals and the like to/from the Internet and other communication devices according to a predetermined protocol such as, for example, TCP/IP.

The sensor 915 corresponds to various types of sensors such as an acceleration sensor, a gyro sensor, a geomagnetic sensor, a light sensor, a sound sensor, a distance measuring sensor, and a force sensor, for example. The sensor 915 acquires information regarding a state of the information processing apparatus 900 itself, such as an attitude and a movement speed of the information processing apparatus 900, and information regarding a surrounding environment of the information processing apparatus 900, such as brightness and noise of the periphery of the information processing apparatus 900. In addition, the sensor 915 may include a GPS sensor that receives a GPS signal, and measures latitude, longitude, and altitude of the device.

Further, the network 920 is a wired or wireless transmission path of information transmitted from devices connected to the network 920. For example, the network 920 may include a public circuit network such as the Internet, a telephone circuit network, or a satellite communication network, various local area networks (LANs) including Ethernet (registered trademark), a wide area network (WAN), and the like. In addition, the network 920 may include a dedicated circuit network such as an internet protocol-virtual private network (IP-VPN).

Hereinbefore, an example of a hardware configuration capable of realizing the functions of the information processing apparatus 900 according to this embodiment of the present disclosure is shown. The respective components may be implemented using universal members, or may be implemented by hardware specific to the functions of the respective components. Accordingly, according to a technical level at the time when the embodiments of the present disclosure are executed, it is possible to appropriately change hardware configurations to be used.

Note that, a computer program for realizing each of the functions of the information processing apparatus 900 according to the present embodiment of the present disclosure as described above may be created, and may be mounted in a PC or the like. Furthermore, a computer-readable recording medium on which such a computer program is stored may be provided. The recording medium is a magnetic disc, an optical disc, a magneto-optical disc, a flash memory, or the like, for example. In addition, the above-described computer program may be distributed through, for example, a network without using a recording medium.

5. Concluding Remarks

As described above, according to the embodiment of the present disclosure, it is possible to obtain the accuracy of the parameter regarding the attitude of the viewpoint at which the image-capturing is performed with higher accuracy.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, although the above-mentioned embodiments describe examples of correcting a parameter regarding the attitude between viewpoints, the use of the parameter regarding the attitude between the corrected viewpoints makes it possible to correct the parameter regarding the attitude of each viewpoint in the same coordinate system (e.g., what is called world coordinate system).

In addition, steps in the above-described embodiment need not be always processed in chronological order in accordance with the order described as a flowchart diagram. For example, steps in the processes in the above-described embodiment may be processed in an order different from the order described as a flowchart diagram, or may be concurrently processed.

Further, the effects described in this specification are merely illustrative or exemplified effects and are not necessarily limitative. That is, with or in the place of the above effects, the technology according to the present disclosure may achieve other effects that are clear to those skilled in the art on the basis of the description of this specification.

Additionally, the following configurations also belong to the technical scope of the present disclosure may.

(1)

An information processing apparatus including:

a plane estimator configured to estimate a plane on the basis of a first depth map, the first depth map being obtained on the basis of a plurality of captured images acquired by image-capturing at a plurality of viewpoints; and a correction unit configured to correct a parameter regarding an attitude of the plurality of viewpoints on the basis of comparison between the first depth map and the plane.

(2)

The information processing apparatus according to (1), in which the correction unit performs comparison between the first depth map and a second depth map generated on the basis of the plane.

(3)

The information processing apparatus according to (2), in which the parameter includes a pitch angle or a yaw angle between the plurality of viewpoints.

(4)

The information processing apparatus according to (3), in which the correction unit corrects the pitch angle using a first estimation value calculated on the basis of the comparison between the first depth map and the second depth map to acquire a corrected pitch angle.

(5)

The information processing apparatus according to (4), in which the correction unit calculates the first estimation value by the comparison between the first depth map and the second depth map for each of regions divided into four by a horizontal centerline and a vertical centerline.

(6)

The information processing apparatus according to (5), in which the correction unit calculates a sum of differences between the first depth map and the second depth map for each of the regions to calculate the first estimation value on the basis of the sum of the differences.

(7)

The information processing apparatus according to (6), in which the first estimation value is calculated on the basis of an absolute value of a difference between the sums of the differences calculated for each of upper and lower regions among four regions divided into four by the horizontal centerline and the vertical centerline.

(8)

The information processing apparatus according to any one of (4) to (7), in which the correction unit specifies, as the corrected pitch angle, a pitch angle at which the first estimation value satisfies a predetermined condition.

(9)

The information processing apparatus according to any one of (3) to (8), in which the correction unit corrects the yaw angle using a second estimation value calculated on the basis of the comparison between the first depth map and the second depth map to acquire a corrected yaw angle.

(10)

The information processing apparatus according to (9), in which the correction unit calculates the second estimation value on the basis of a variance of a difference between the first depth map and the second depth map.

(11)

The information processing apparatus according to (10), in which the correction unit specifies, as the corrected yaw angle, a yaw angle at which the second estimation value satisfies a predetermined condition.

(12)

The information processing apparatus according to any one of (4) to (11), in which the first depth map is generated by stereo matching based on the plurality of captured images, and a search direction for a corresponding point in the stereo matching includes a horizontal direction.

(13)

The information processing apparatus according to (12), in which the correction unit corrects the yaw angle after correction of the pitch angle.

(14)

The information processing apparatus according to any one of (2) to (13), in which the second depth map is generated by projecting a three-dimensional point group on the plane.

(15)

The information processing apparatus according to any one of (2) to (14), in which the correction unit sets a processing target region on the basis of the first depth map and the second depth map and corrects the parameter on the basis of the comparison between the first depth map and the plane in the processing target region.

(16)

The information processing apparatus according to (15), in which the correction unit sets the processing target region on the basis of a region in which an absolute value of a difference between the first depth map and the second depth map is larger than a predetermined threshold.

(17)

The information processing apparatus according to (16), in which the processing target region is vertically symmetric.

(18)

An information processing method executed by a processor, including:

estimating a plane on the basis of a first depth map, the first depth map being obtained on the basis of a plurality of captured images acquired by image-capturing at a plurality of viewpoints; and correcting a parameter regarding an attitude of the plurality of viewpoints on the basis of comparison between the first depth map and the plane.

(19)

A program for causing a computer to execute:

a function of estimating a plane on the basis of a first depth map, the first depth map being obtained on the basis of a plurality of captured images acquired by image-capturing at a plurality of viewpoints; and a function of correcting a parameter regarding an attitude of the plurality of viewpoints on the basis of comparison between the first depth map and the plane.

REFERENCE SIGNS LIST 1, 2 Information processing apparatus
7 Stereo camera
7L Left camera
7R Right camera
8 Projector
9 Table
10 Control unit
11 Parallelization processor
12 Depth map generator
13 Plane estimator
15 Correction unit
17 Display controller
19 Projector controller
30 Operation unit
40 Display unit
50 Storage unit
60 Interface unit
152 Comparator
156 Correction controller
254 Processing target region setting unit
256 Correction controller

The invention claimed is:
1. An information processing apparatus, comprising:
a central processing unit (CPU) configured to:

acquire a plurality of captured images, wherein the plurality of captured images corresponds to a plurality of viewpoints;
generate a first depth map based on the plurality of captured images;
estimate a plane based on the first depth map;
generate a second depth map based on the estimated plane;
compare the first depth map and the second depth map;
calculate a first estimation value based on the comparison between the first depth map and the second depth map;
pitch angle between the plurality of viewpoints based on the first estimation value;
calculate a second estimation value based on the comparison between the first depth map and the second depth map; and
correct a yaw angle between the plurality of viewpoints based on the second estimation value, wherein the yaw angle is corrected after the correction of the pitch angle.

2. The information processing apparatus according to claim 1, wherein
a horizontal centerline and a vertical centerline divide the first depth map and the second depth map into four regions, and
the CPU is further configured to calculate the first estimation value based on the comparison between the first depth map and the second depth map for each of the four regions.

3. The information processing apparatus according to claim 2, wherein the CPU is further configured to:
calculate a sum of differences between the first depth map and the second depth map for each of the four regions; and
calculate the first estimation value based on the sum of the differences.

4. The information processing apparatus according to claim 3, wherein the CPU is further configured to:
calculate an absolute value of a difference between the sum of the differences for each of a plurality of upper regions and a plurality of lower regions among the four regions; and
calculate the first estimation value based on the absolute value.

5. The information processing apparatus according to claim 1, wherein the CPU is further configured to specify, as the corrected pitch angle, a pitch angle at which the first estimation value satisfies a specific condition.

6. The information processing apparatus according to claim 1, wherein the CPU is further configured to calculate the second estimation value based on a variance of a difference between the first depth map and the second depth map.

7. The information processing apparatus according to claim 6, wherein the CPU is further configured to specify, as the corrected yaw angle, a yaw angle at which the second estimation value satisfies a specific condition.

8. The information processing apparatus according to claim 1, wherein
the CPU is further configured to generate the first depth map by a stereo matching process,
the stereo matching process is based on the plurality of captured images, and
a search direction for a corresponding point in the plurality of captured images in the stereo matching process includes a horizontal direction.

9. The information processing apparatus according to claim 1, wherein the CPU is further configured to generate the second depth map based on projection of a three-dimensional point group on the plane.

10. The information processing apparatus according to claim 1, wherein the CPU is further configured to:
set a processing target region based on the first depth map and the second depth map; and
correct each of the pitch angle and the yaw angle based on the comparison between the first depth map and the second depth map in the processing target region.

11. The information processing apparatus according to claim 10, wherein the CPU is further configured to set the processing target region based on a region in which an absolute value of a difference between the first depth map and the second depth map is larger than a predetermined threshold.

12. The information processing apparatus according to claim 11, wherein the processing target region is vertically symmetric.

13. An information processing method, comprising:
acquiring a plurality of captured images, wherein the plurality of captured images corresponds to a plurality of viewpoints;
generating a first depth map based on the plurality of captured images;
estimating a plane based on the first depth map;
generating a second depth map based on the estimated plane;
comparing the first depth map and the second depth map;
calculating a first estimation value based on the comparison between the first depth map and the second depth map;
correcting a pitch angle between the plurality of viewpoints based on the first estimation value;
calculating a second estimation value based on the comparison between the first depth map and the second depth map; and
correcting a yaw angle between the plurality of viewpoints based on the second estimation value, wherein the yaw angle is corrected after the correction of the pitch angle.

14. A non-transitory computer-readable medium having stored thereon computer-executable instructions which, when executed by a computer, cause the computer to execute operations, the operations comprising:
acquiring a plurality of captured images, wherein the plurality of captured images corresponds to a plurality of viewpoints;
generating a first depth map based on the plurality of captured images;
estimating a plane based on the first depth map;
generating a second depth map based on the estimated plane;
comparing the first depth map and the second depth map;
calculating a first estimation value based on the comparison between the first depth map and the second depth map;
correcting a pitch angle between the plurality of viewpoints based on the first estimation value;
calculating a second estimation value based on the comparison between the first depth map and the second depth map; and
correcting a yaw angle between the plurality of viewpoints based on the second estimation value, wherein the yaw angle is corrected after the correction of the pitch angle.

* * * * *